United States Patent
Matsuyama et al.

(10) Patent No.: US 6,767,282 B2
(45) Date of Patent: Jul. 27, 2004

(54) MOTION-CONTROLLED VIDEO ENTERTAINMENT SYSTEM

(75) Inventors: Shigenobu Matsuyama, Tokyo (JP); Shinichi Nakagawa, Tokyo (JP); Naoki Niihama, Tokyo (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 10/206,967

(22) Filed: Jul. 30, 2002

(65) Prior Publication Data

US 2003/0078086 A1 Apr. 24, 2003

(30) Foreign Application Priority Data

Oct. 19, 2001 (JP) ........................................ 2001-322621

(51) Int. Cl.⁷ .................................................. A63F 9/24
(52) U.S. Cl. ........................................................ 463/3
(58) Field of Search ........................ 463/1, 3, 8, 30–34, 463/39; 345/156

(56) References Cited

U.S. PATENT DOCUMENTS

| | | | |
|---|---|---|---|
| 4,858,934 A | 8/1989 | Ladick et al. | |
| 4,971,325 A | 11/1990 | Lipps | |
| 5,616,078 A | * 4/1997 | Oh ................................. | 463/8 |
| 5,685,782 A | 11/1997 | Lipps et al. | |
| 5,730,655 A | 3/1998 | Meredith | |
| 6,028,593 A | 2/2000 | Rosenberg et al. | |
| 6,162,123 A | 12/2000 | Woolston | |
| 6,416,327 B1 | 7/2002 | Wittenbecher | |

FOREIGN PATENT DOCUMENTS

| | | | | |
|---|---|---|---|---|
| JP | 2-33617 A | 2/1990 | | |
| JP | 3-186287 A | 8/1991 | | |
| JP | 07-253774 A | 3/1995 | | |
| JP | 8-196745 A | 8/1996 | | |
| JP | 09-081310 A | 3/1997 | | |
| JP | 11-144061 A | 5/1999 | | |
| JP | 11-164924 A | 6/1999 | | |
| JP | 11-197357 A | 7/1999 | | |
| JP | 11-305935 A | 11/1999 | | |
| JP | 2000-0020193 | 1/2000 | | |
| JP | 2002-308756 | * 7/2000 | ........... | A63F/13/00 |
| JP | 2000-300839 | 10/2000 | | |
| JP | 2000-308756 A | 11/2000 | | |
| JP | 2001-70639 A | 3/2001 | | |

OTHER PUBLICATIONS

Survey: Research Trend of Immersive Communication Technology, Information Processing Society of Japan Research Report, vol. 99, No. 87, pp. 31–36, published Oct. 15, 1999.

Virtual Golf Simulation—Picture Perfect Golf, I/O Magazine, vol. 23, No. 3, published Mar. 1, 1998.

* cited by examiner

*Primary Examiner*—Kim Nguyen
(74) *Attorney, Agent, or Firm*—Shinjyu Global IP

(57) ABSTRACT

A golf game device that generates a natural interest in golf without taking up a large amount of space. A player swings a grip which is shaped like the grip of a golf club. On a first monitor, a virtual club head moving in accordance with the movement of the grip is displayed. An imaginary shaft extends from the grip, and the virtual club head is displayed as if it were attached to the end of the shaft. The player takes aim at his target direction (to which a ball is to be hit) by viewing scenery displayed on a second monitor, and hits a ball displayed in his underfoot view on the first monitor. The front view and underfoot view change according to the position where a virtual player stands in the game space. Accordingly, the player can play with the sense that he is actually playing a golf course.

19 Claims, 30 Drawing Sheets

| Par | 0 |
|---|---|
| Bogey | -1 |
| Double Bogey | -2 |
| Triple Bogey | -3 |
| ⋮ | ⋮ |
| Birdie | +1 |
| Eagle | +2 |
| Albatross | +3 |
| ⋮ | ⋮ |

*Fig. 5A*

| | 1st Hole | | | 2nd Hole | ··· | Total Score |
|---|---|---|---|---|---|---|
| | Score | Time Points Deducted | Life | ··· | ··· | |
| Player1 | Par | 0 | 3 | ··· | ··· | 54 |
| Player2 | Bogey | -1 | 2 | ··· | ··· | 36 |
| Player3 | Birdie | 0 | 4 | ··· | ··· | 63 |
| Player4 | Double Bogey | -1 | 0 | ··· | ··· | 20 |

HOW MANY PLAYERS ?

1 PLAYER

2 PLAYERS

3 PLAYERS

4 PLAYERS

Fig. 8

MOTION-CONTROLLED VIDEO ENTERTAINMENT SYSTEM

BACKGROUND OF THE INVENTION

1. Field of the Invention

This invention generally relates to video game systems in which a player manipulates a virtual interface device within a game space, wherein a virtual interface device represents a real interface device that the player within a real space manipulates.

2. Background Information

In conventional video golf games used in the home or in video game arcades, for example, the swinging motion of an object (i.e., the golf club) in the game space is controlled by pushing buttons or by pulling levers. However, controlling objects by manipulating buttons or levers gives a player a feeling that the game is not realistic, and does not provide a game that allows a player to experience the real charm of golf. Accordingly, most people who play video golf games turn out to be people who simple love to play video games. To begin with, commands that instruct which object within the game space is moved and in what direction are assigned to the buttons and levers in advance. Thus, movement of the object by means of the buttons and levers is limited by the combinations of action patterns preset in the game.

On the other hand, golf simulation devices have been offered in which a golf player can practice easily. However, these devices take up too much space and are quite expensive, and thus are not favored by video game arcade operators.

In order to manipulate golf balls more naturally, for example, H10-214155A discloses an input device shaped like a golf club, in which the movement of the input device is detected and the swing motion thereof is input. An acceleration sensor is installed at the inside of the head. If the acceleration level of the head detected by the acceleration sensor exceeds a certain level, the input device determines that the player intends to hit a ball.

However, a full swing of a golf club requires a large amount of space around a player, and it also requires an increase in the space in which the input device is set. In addition, swinging a golf club is risky at a video game arcade because there are often many people present. Moreover, in order to allow a player to naturally enjoy a golf game, it is not enough that a player can hit a golf ball by swinging a golf club. For example, in order to allow a player to hit a ball in a particular direction with a club, it is necessary to create visual factors that provide the player with targets. In addition, when a player plays a real golf game, he chooses his favorite club from amongst a variety of golf clubs and uses it. Accordingly, a golf game in which he uses only one kind of golf club won't satisfy a golf player, and won't attract general users other than people who simply like to play video games.

SUMMARY OF THE INVENTION

Therefore, an object of the present invention is to provide a video game device that allows a player to feel the charms of a variety of different games. Another object of the present invention is to provide a video game device that does not take up a lot of space. Yet another object of the present invention is to provide a video game device that is safe to use.

According to one aspect of the present invention, a game device is provided in which a real interface device operated by a player within a real space is represented by a virtual interface device in a virtual space. The virtual interface device in the game device includes a virtual contact unit and a virtual operation unit. The virtual contact unit is a portion of the virtual interface device that a virtual player who manipulates the virtual interface device contacts in order to operate the virtual interface device. The virtual operation unit is a portion of the virtual interface device that manipulates an object operated by the virtual interface device.

The game device includes:

(a) position detection means for detecting the position of the real interface device within the real space, wherein the real interface device is shaped like the virtual contact unit, conversion means for converting the detected real position of the real interface device into a virtual position within the virtual space that is a virtual position of the virtual contact unit within the virtual space, (b) calculating means for calculating the virtual position of the virtual operation unit based on the virtual position of the virtual contact unit, (c) operating means for moving the virtual operation unit within the virtual space so that its movement follows the movement of the real interface device with in the real space, which repeatedly causes the real position of the real interface device to be detected by the position detective means, the virtual position of the virtual contact unit to be calculated by the converting means, and the virtual position of the virtual operation unit to be calculated by the calculating means.

Assume, for example, that the video game device is a golf game device. The virtual interface device is a virtual golf club within a game space. The virtual contact unit corresponds to the virtual grip and the virtual operation unit corresponds to the virtual head. The real interface device is shaped like a grip of a golf club or that of a mini golf club that is much shorter than a golf club. Or suppose that the video game device is a tennis game device. In this case, the virtual interface device is a virtual tennis racket within a game space. The virtual contact unit corresponds to the virtual grip and the virtual operation unit corresponds to the virtual racket face. The real interface device is shaped like a grip of a tennis racket or that of a mini tennis racket that is much shorter than a tennis racket. Or suppose that the video game device is a baseball game device. In this case, the virtual interface device is a virtual bat. The virtual contact unit corresponds to the grip of the virtual bat and the virtual operation unit corresponds to the upper on third of the virtual bat. The real interface device is shaped like a grip of a bat or that of a mini bat that is much shorter than a baseball bat.

If the video game device is a golf game device, a player swings a grip-type real interface device, then the movement of the virtual head of the virtual golf club is calculated. If the game device is a tennis game device, and a player swings a grip-type real interface device, the movement of the virtual racket face is calculated. If the game device is a baseball game device, a player swings the grip-type real interface device, then the movement of the portion of the virtual bat within the virtual game space that hits a ball is calculated.

According to another aspect of the present invention, the game device further includes:

(a) display means for displaying the virtual operation unit, and (b) position determining means for determining a display position at which the virtual operation unit is displayed on a screen, based on the virtual position of the virtual operation unit.

In this game device, the operating means causes the real position of the real interface device to be detected by the position detecting device, the virtual position of the virtual contact unit to be calculated by the converting means, the virtual position of the virtual operation unit to be calculated by the calculating means, and the display position of the virtual operation unit to be determined by the position determining means, with these actions being executed repeatedly. The operating means displays the movement of virtual operation unit so that it follows the movement of the real interface device.

Assume, for example, the video game device is a golf game device. The device determines the virtual position of the virtual grip, and calculates a position at which a straight line intersects with the ground of the virtual space. The line goes through the virtual position of the virtual grip and has a certain inclination. The device regards the intersection as the virtual position of the virtual head and displays the virtual head. The game device detects the movements of the grip-type real interface device and displays the movement of the virtual head, which causes the above-mentioned steps at predetermined time intervals. The player can enjoy swinging the real interface device, which is shaped like a golf grip, and will feel as though it is a real golf club. The position within the real space and the position within the game space can be described, for example, with three dimensional coordinates. If the video game device is a golf game device, it preferably includes selecting means for any one of various kinds of virtual golf clubs. In this case, the operating means may display a virtual head corresponding to the kind of the virtual golf club selected. For example, the video game device accepts the selection of the golf club by pushing a button on the video game device, and displays the head of a golf club selected, such as a driver or 5-iron.

According to another aspect of the present invention, the real interface device and the virtual interface are configured to be slightly long (e.g., the length of the grip portion of a golf club, tennis racket, baseball bat, etc.), and the video game device further includes twist detecting means. The twist detecting means detects the degree to which the real interface device is twisted from the standard position around the axis of the real interface device. The operating means displays on a screen the virtual operation unit of the virtual interface device that rotates at the twist angle around the axis of the virtual interface device. Take, for example, a golf game device. A player twists the grip-type real interface device, then the rotation of the virtual head follows the twist action of the player.

According to another aspect of the present invention, the twist detecting means calculates the twist angle of the real interface device based on signals outputted from an acceleration sensor installed on the real interface device.

A three-axis-acceleration sensor may be utilized for detecting the angle at which the real interface device is with respect to the floor, and detecting the angle at which the real interface device is with respect to certain directions on the floor surface. The twist angles can be calculated based on the angles detected.

According to another aspect of the present invention, the video game device is a golf game device. The displaying means of this golf game device further displays scenery at the virtual player's feet. This golf game device further includes front displaying means for displaying scenery in front of the player. 'Front' means the direction in which the virtual player is to hit the ball.

The golf game device preferably displays an underfoot view on a lower screen and the front view on a front screen. The underfoot view is the scenery at the virtual player's feet from the viewpoint of the virtual player. The front view is the scenery from the viewpoint spreading out in front of the virtual player. The viewpoint may be calculated based on the virtual position of the virtual contact unit. The underfoot view and the front view can be created by making a perspective-projection transformation in the game space.

According to yet another aspect of the present invention, the game device further includes (a) display controlling means for generating an underfoot view and a front view and displaying them by utilizing the displaying means and the front displaying means, wherein the views are from the virtual player's viewpoint and calculated from the virtual position of the virtual contact unit, and (b) underfoot view storing means for storing an underfoot view whose resolution is higher than that of an underfoot view generated by the display controlling means. The display controlling means of the game device controls the underfoot views so that the underfoot view stored in the underfoot view storing means is displayed on behalf of the underfoot view generated by the display controlling means.

The underfoot view generated by perspective-projection transformation based on the data composing the game space is too rough to display it as an underfoot view. Thus, the player feels incongruous with the underfoot view if it is displayed at his feet. This is because it is natural for a player that resolution of an underfoot view close to him is higher than that of front view far from him. Thus, the game device stores the data for an underfoot view in advance and displays it on the screen. For example, an underfoot view of a fairway is displayed if the virtual player is on a fairway, and an underfoot view in a bunker is displayed if the virtual player is in a bunker.

According to yet another aspect of the present invention, the game device further includes:

(a) display controlling means for displaying an underfoot view and a front view by utilizing the displaying means and the front displaying means, wherein the views are from the virtual player's viewpoint (hereinafter, virtual viewpoint) that is calculated based on the virtual position of the virtual contact unit, (b) view controlling means for shifting the viewpoint for catching the front view from the virtual viewpoint, wherein the shift is executed whether the front view is close to or far from the virtual player. The game device shifts the viewpoint position for the front view when the virtual player is at the tee and looks in the direction of the green, and when the virtual player on a green and looks in the direction of the cup. This is in order not to have the player feel incongruence when the underfoot view and the front view are connected. The view controlling means preferably shifts the viewpoint for the front view to a point that is continuously connected with the underfoot view from the virtual viewpoint when the front view is close to the virtual player. Accordingly, if a front view is close to the virtual player, a front view is displayed that is continuous with the underfoot view from the virtual viewpoint.

According to yet another aspect of the present invention, the position detecting means further includes:

(a) at least a pair of light-detecting means for detecting light from light emitting means or light reflecting means, and measuring means for measuring the position of the light emitting means or the light reflecting means and outputting the measurement result to the conversion means, wherein the light emitting means and/or the light reflecting means are installed in or on the real interface device.

According to another aspect of the present invention, the calculating means determines the virtual position of the virtual operation unit by regarding it as a position at which a straight line intersects with the ground of the virtual space, wherein the line goes through the virtual position of the virtual contact unit, and is at an angle (hereinafter, virtual inclination angle φ) with a standard plane in the virtual space.

Assume, for example, a golf game device. The virtual inclination angled) maybe an average value of the angle between the angle at which a golf club is normally held by an ordinary golf player and the ground. Or the virtual inclination angle φ may be the angle between the position that a grip-type real interface device is normally held by an ordinary player and the floor. In a tennis game device, the virtual inclination angle φ may be an average value of the angle between a tennis court and the position of the grip when an ordinary tennis player hits a tennis ball.

According to yet another aspect of the present invention, the video game device further includes inclination detecting means for detecting an angle (hereinafter, real inclination angle) between the real interface device and the standard plane in the real space. The calculating means of the game device calculates the virtual position of the virtual operation unit by regarding the real inclination angle detected as the virtual inclination angle φ. An example of an inclination detecting means includes a three-axis acceleration sensor installed in the grip-type real interface device.

According to yet another aspect of the present invention, the inclination detecting means calculates the real inclination angle of the real interface device based on signals outputted from an acceleration sensor installed in the real interface device.

The angle between the real interface device and the floor surface, and the angle between the real interface device and a certain direction on the floor surface, can be detected by utilizing an acceleration sensor such as three-axis-acceleration sensor.

According to another aspect of the present invention, the game device further includes:
(a) trajectory storing means for storing the virtual positions of the virtual operation unit taken at predetermined time intervals $\Delta T_1$,
(b) area determining means for determining whether the latest stored virtual position of the virtual operation unit is in a hit area in which the object operated by the virtual interface device exists,
(c) stay determining means for determining whether the virtual operation unit has been in consecutive existence for a prescribed stay time Ts or more, based on the virtual positions stored, when the latest virtual position of the virtual operation unit exists in the hit area, and
addressing means for determining that the player is addressing the ball when the virtual operation unit has been in consecutive existence in the hit area for the prescribed stay time Ts or more.

Take, for example, a golf game. The hit area is a circle having a radius r and having a golf ball placed in the center thereof. If the virtual head has been in consecutive existence in the hit area for a prescribed stay time Ts or more, the player is regarded to be addressing the ball. The hit area may become larger or smaller according to kinds of the virtual golf club used. For example, the hit area becomes smaller if the virtual golf club is changed from a driver to an iron, or a putter. Ordinary golf players are supposed to change their swings according to the kind of golf clubs used. Accordingly, setting hit areas corresponding to the kind of golf clubs used allows a game player using the grip-type real interface device to swing without feeling any incongruity. Likewise, the game device determines the player is ready to hit the ball in a tennis game device and the like.

According to yet another aspect of the present invention, the game device further includes:
(a) passage determining means for determining whether the virtual operation unit has passed through the hit area when the player is addressing the ball,
(b) speed determining means for determining whether the passage time is at or below the prescribed passage time Tp when the virtual operation unit has passed through the hit area, and
(c) operation determining means for determining whether the player has manipulated the object by means of the virtual interface device when the passage time is at or below the prescribed passage time Tp.

Take, for example, a golf game situation in which the virtual head has passed through the hit area with a speed faster than the prescribed speed after the player's address. In this case, the player is regarded to have hit the ball. If the passage speed is too slow, the player is regarded to have made a practice swing or that he has made a movement that is unrelated to his swing. Then, the ball is not moved and remains in place. The prescribed passage time Tp may fluctuate corresponding to the kind of virtual golf clubs used. For example, the prescribed passage time Tp is set to be relatively short for a driver and it is set to be relatively long for a putter. Controlling the prescribed passage time Tp in consideration of the differences between the different swings used with various kinds of golf clubs allows the player to swing naturally with the real interface device.

According to another aspect of the present invention, the game device further includes:
(a) trajectory determining means for determining the trajectory of the virtual operation unit in the hit area based on the data stored in the trajectory storing means, when the operation determining means determines that the player has manipulated the object, and
(b) trajectory calculating means for calculating the trajectory of the object, based on the trajectory of the virtual operation unit.

The trajectory calculating means moves the ball if the operation determining means determines that the ball was hit, even though the trajectory of the virtual head may not have hit the golf ball. The trajectory of the ball is calculated based on the swing direction. In other words, it is calculated based on the trajectory of the virtual head.

According to another aspect of the present invention, the real interface device and the virtual interface device is configured to be somewhat long and the game device further includes:
(a) twist detecting means for detecting the angle at which the real interface device is twisted from a standard position around the longitudinal axis of the real interface device,
(b) trajectory determining means for determining the trajectory of the virtual operation unit in the hit area based on the data stored in the trajectory storing means, when the operation determining means determines the player has manipulated the object, and (c) trajectory calculating means for calculating the trajectory on which the object has moved, based on the trajectory of the virtual operation unit and the twist angle detected.

In a golf game, for example, the trajectory calculating means calculates the trajectory of the ball in consideration of the twist angle, i.e., the direction of the face of the virtual head, in addition to the swing direction. In a tennis game device, the trajectory calculating means calculates the trajectory of the ball in consideration of the direction of the racket, which is changed when a player slices or drives. Moreover, the operation determining means determines that the player has manipulated the object when the twist angle is within the prescribed twist angle and the passage time is in the range of the prescribed passage time Tp. In other words, the operation determining means determines the player didn't hit the ball if he has twisted the grip-type real interface device too much, even though the player had addressed and had swung at the speed that is faster than the prescribed speed. Likewise, the operation determining means determines that the player didn't hit the ball if he had twisted the virtual tennis racket too much in a tennis game device.

According to yet another aspect of the present invention, the operation determining means determines the player has manipulated the object when the distance between the trajectory of the virtual operation unit and the object is in the range of a permissible gap and the passage time is at or below the prescribed passage time Tp.

The operation determining means determines that the player has swung and missed if the trajectory of the virtual head missed the ball by too much, even though the virtual head had passed through the hit area. This is because it will not feel realistic to a player if the ball has moved in such situations. Likewise, in a tennis game device, the operation determining means determines that the player has swung and missed if the virtual racket face missed the ball by too much, even though the virtual racket face has passed through the hit area. The range of permissible gap in the golf game can change with the kind of the virtual golf clubs used. Take, for example, a situation in which the player swings a driver and the virtual head hits the golf ball very quickly. In this situation, the range of the allowable gap is rather wide because the player will not notice the gap between the ball and the virtual head trajectory. On the contrary, take a situation in which the player swings a putter. A putter is swung slowly and the player can catch the movement of the virtual head at the moment he hits the ball. Thus, the range of the allowable gap is nearly zero for a putter. Otherwise, the player feels incongruity.

According to yet another aspect of the present invention, a game method is employed in a game device in which a real interface operated by a player within a real space is represented by the virtual interface device within a virtual interface device.

According to yet another aspect of the present invention, a game program is provided that causes a computer to execute each of the steps of the method cited above. Further, computer-readable storage media on which this program is recorded are also included in the scope of the present invention. Examples of compute-readable recording media include, but are not limited to, flexible discs, hard discs, semiconductor memory, CD-ROMs, DVDs, magnet-optical discs (MOs), and other computer read/writeable recording media.

According to yet another aspect of the present invention, a game system is provided in which a real interface device operated by a player within a real space is represented by a virtual interface device within a virtual space.

These and other objects, features, aspects and advantages of the present invention will become apparent to those skills in the art from the following details description, which, taken in conjunction with the annexed drawings, discloses a preferred embodiment of the present invention.

BRIEF DESCRIPTION OF THE DRAWINGS

Referring now to the attached drawings which form a part of this original disclosure:

FIGS. 5A and 5B shows an example of how to count the player's score in the golf game system illustrated in FIG. 2;

FIG. 8 is an example of a screen displayed in the golf game system illustrated in FIG. 2 that allows a player to select a number of players;

DETAILED DESCRIPTION OF THE PREFERRED EMBODIMENTS

First Embodiment

Configuration of the Game System

Figure 1:
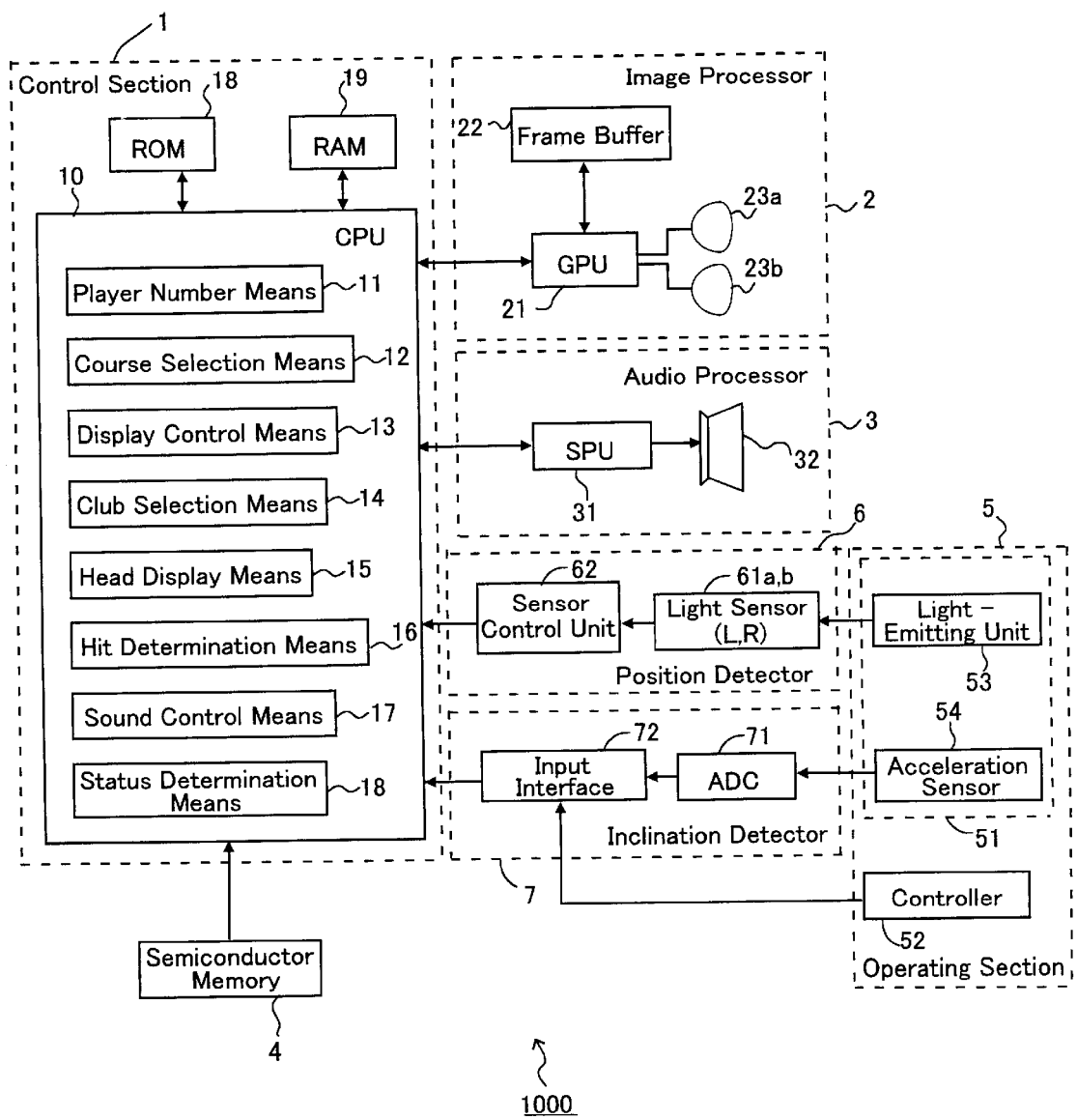
FIG. 1 is a block diagram illustrating the configuration of a golf game system according to a first embodiment of the present invention.

FIG. 1 is a block diagram illustrating a golf game system 1000 according to a first embodiment of the present invention. The golf game system 1000 includes a control section 1, an image processor 2, an audio processor 3, a semiconductor memory 4, an operating section 5, a position detector 6, and an inclination detector 7.

The control section 1 includes a CPU 10, ROM 18 and a RAM 19. The CPU 10 conducts a number of functions based on an operating system (OS) stored in the ROM 18 and on game data stored in the RAM 19. The OS stored in ROM 18 controls each portion of the golf game system 1000. The RAM 19 is used as a work area that temporarily saves various game data which is read out from the semiconductor memory 4 as needed.

The image processor 2 includes a GPU (graphics processing unit) 21, a frame buffer 22, and two monitors 23a, 23b. Based on calculations made by the CPU 9, the GPU 21 writes CG images made up of polygon combinations into the frame buffer 22, and are temporarily stored in the frame buffer 22. The CG images stored in the frame buffer 22 are read out and displayed on the monitors 23a, 23b. Continuous processing and storing of CG images into the frame buffer 22 by the GPU 21 results in the display of an animated CG image on the monitor 23a, 23b.

The audio processor 3 includes an SPU (sound processing unit) 31 and a speaker 32. The SPU 31 plays music and sound effects based upon music data and a variety of sound effects data stored in the semiconductor memory 4.

Game data and a various game data are recorded in the semiconductor memory 4.

The operating section 5 includes a real interface device 51 shaped like a grip of a golf club and a controller 52. The grip-type real interface device 51 is an input means that a player in the real space R swings in order to hit a golf ball (the object) within a game space. The light emitting unit 53, and an acceleration sensor 54 which detects the acceleration of the grip type real interface device 51, are installed in the grip-type real interface device 51. A marker can be utilized on behalf of the light-emitting unit 53. An example of the controller 52 is buttons configured in the golf ball system 1000. The controller 52 is an input means that the player manipulates in order to select the number of players, the level of golf courses, the kinds of golf clubs to be used and the like.

The position detector 6 has a function that detects the position of the light-emitting unit 53 of the grip-type real interface device 51. The position detector 6 employs, for example, a pair of light sensors 61a, 61b for detecting the light emitted from the light-emitting unit 53, and sensor controlling unit 62. The sensor controlling unit 62 determines position data that indicate the position of the grip type real interface device 51 within the real space R, based on the light detected, and sends the position data to the control section 1. The position data sent to the control section 1, for example, are expressed in three-dimensional coordinates in the real space R, numbers representing sub-spaces subdivided from within the real space, or another type of coordinate system known to one of ordinary skill in the art.

Instead of the aforementioned light-emitting unit 53 and light sensor 61a and 61b, it is also possible to utilize ultrasound signal-emitting means and a pair of ultrasound signal sensors that receive the sound sent by the ultrasound signal-emitting means. Moreover, instead of the aforementioned light-emitting unit 53 and light sensor 61a and 61b, it is also possible to utilize markers and CCDs.

The inclination detector 7 detects the twist angle θ and the inclination angle φ of the grip-type real interface device. The twist angle θ is the angle at which the grip-type real interface device is twisted from a standard position around its longitudinal axis. The inclination angle φ is the angle between the grip-type real interface device and a standard plane. The twist angle θ and the inclination angle φ are not necessarily detected. However, detecting those angles allows the player to play a golf game naturally. The inclination detector 7 employs, for example, an analog/digital converter (ADC) 71 for converting analog signals from the three-axis acceleration sensor 54 installed in the grip-type real interface device 51 into digital signals, and an input interface 72 for inputting signals from the ADC 71 into the CPU 10.

2. An Example of a Game System 2-1. Overview of the Game System

Figure 2:
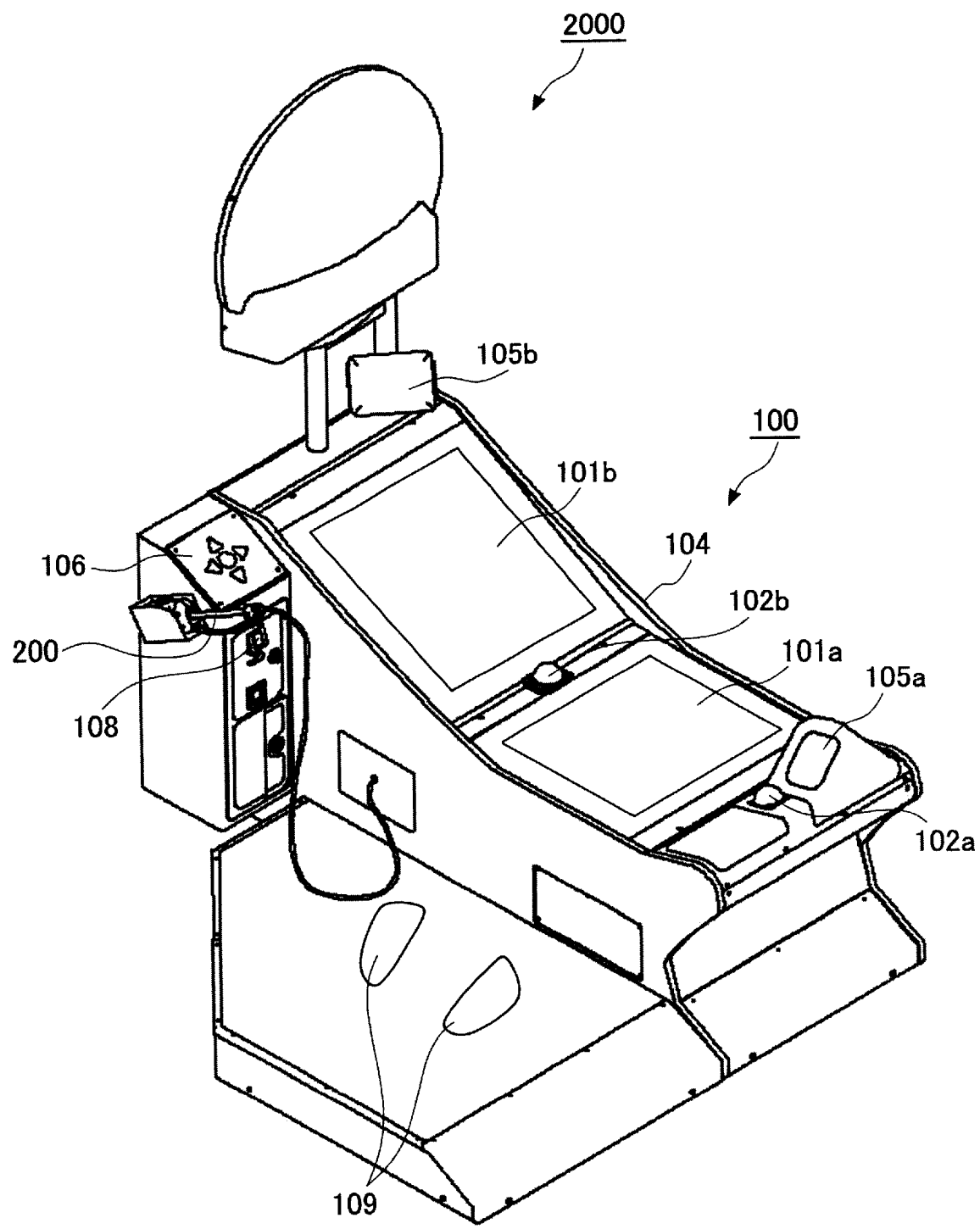
FIG. 2 is an outward appearance of a golf game system which employs the golf game system illustrated in FIG. 1.

FIG. 2 is an oblique view of the outward appearance of a golf game system 2000 in which the foregoing golf game system 1000 is employed. The golf game system 2000 includes the game device 100 and a grip-type of interface device 200 (hereinafter referred to as grip 200) that serves one example of a real interface device 51.

Two monitors 101a and 101b for image output are provided on the game device 100 console. The monitor 101a faces upward and the monitor 101b faces outward at an oblique angle. Both monitors 101a and 101b are arranged left to right from the viewpoint of the player who stands in the front of the game device console. The front side of the game device 100 is the side at which footmarks 109 are indicated. The footmarks 109 indicate the player's standard position. Hereinafter, the arrangement of the golf game system 2000 will be explained in the view of a player standing on the footmarks 109 and facing the front of the game device 100.

Light sensors 102a and 102b, which are only one example of sensors included in the position detector 6, are installed on the left and right of the monitor 101a. The light sensors 102a and 102b detect the light emitted from the light-emitting unit installed on a certain position of the grip 200. A pair of speakers 105a and 105b are installed on the right side of the monitor 101a and the left side of the monitor 101b, and serve to output game background music and sound effects to the player. Buttons 106 are provided on the left portion of the game device 100, and allow the player to select items from a menu that is displayed on the monitor 101. The buttons 106 are one specific example of the controller 52 described above. A coin deposit slot 108 is provided under the speaker 105b and the buttons 106, and serves to accept coins inserted by the player in order to pay for the game.

2-2 The Grip

Figure 3:
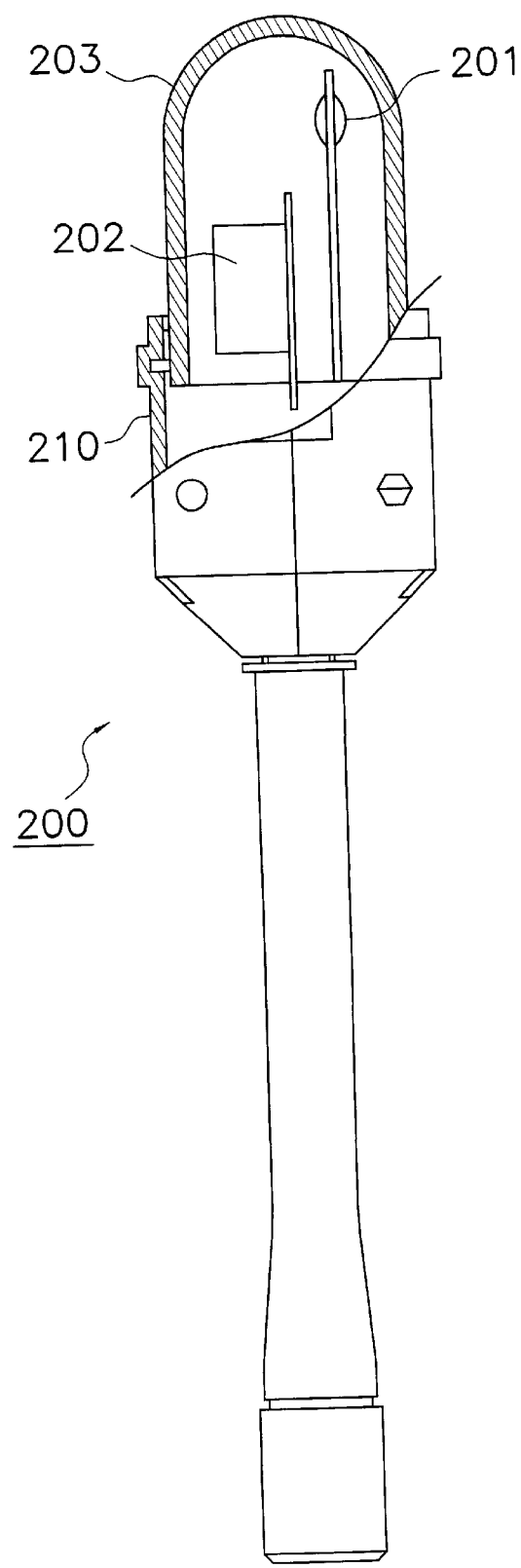
FIG. 3 is a grip type interface device used in the golf game system illustrated in FIG. 2.

FIG. 3 shows the detailed structure of the grip 200. Light-emitting unit 201 is installed inside the tip of the body 210 of the grip 200. The position of the light-emitting unit 201 is a specific example of the position from which the light emitted is not blocked by the player's hand. Cover 203 is composed of a clear material so that the light sensors 102a and 102b can detect the light emitted from the light-emitting unit 201. The light-emitting unit 201 is not particularly limited, but may for example include LEDs that emit infrared light. Because of the directionality in the orientation of the light emitted from LEDs, the light-emitted unit 201 is preferably composed of a plurality of LEDs. A three-axis acceleration sensor 202 is installed on the longitudinal axis of the grip 200 inside the tip of the body 210. The position of the three-axis acceleration sensor 202 is not limited to the axis of the grip 200. The three-axis sensor 202 detects the angle between the grip 200 and the floor, and the rotation angle at which the grip 200 rotates around the axis of the grip 200, and outputs analog signals corresponding thereto. The analog signals are converted into digital signals by ADC 71 in the game device 100, and inputted into the CPU 10 by the input interface 72.

It is also possible to detect the power of the movement or the inclination angle φ of the grip 200 by unitizing the acceleration sensor 202. What is detected depends on the process executed in the golf game system 2000, and which mode is to be selected depends on the purpose of the process. For example, the power of the movement is detected in order to detect the swing speed of the grip 200, and the inclination angle φ is detected for other purposes.

3. Overview of the Golf Game

Figure 4:
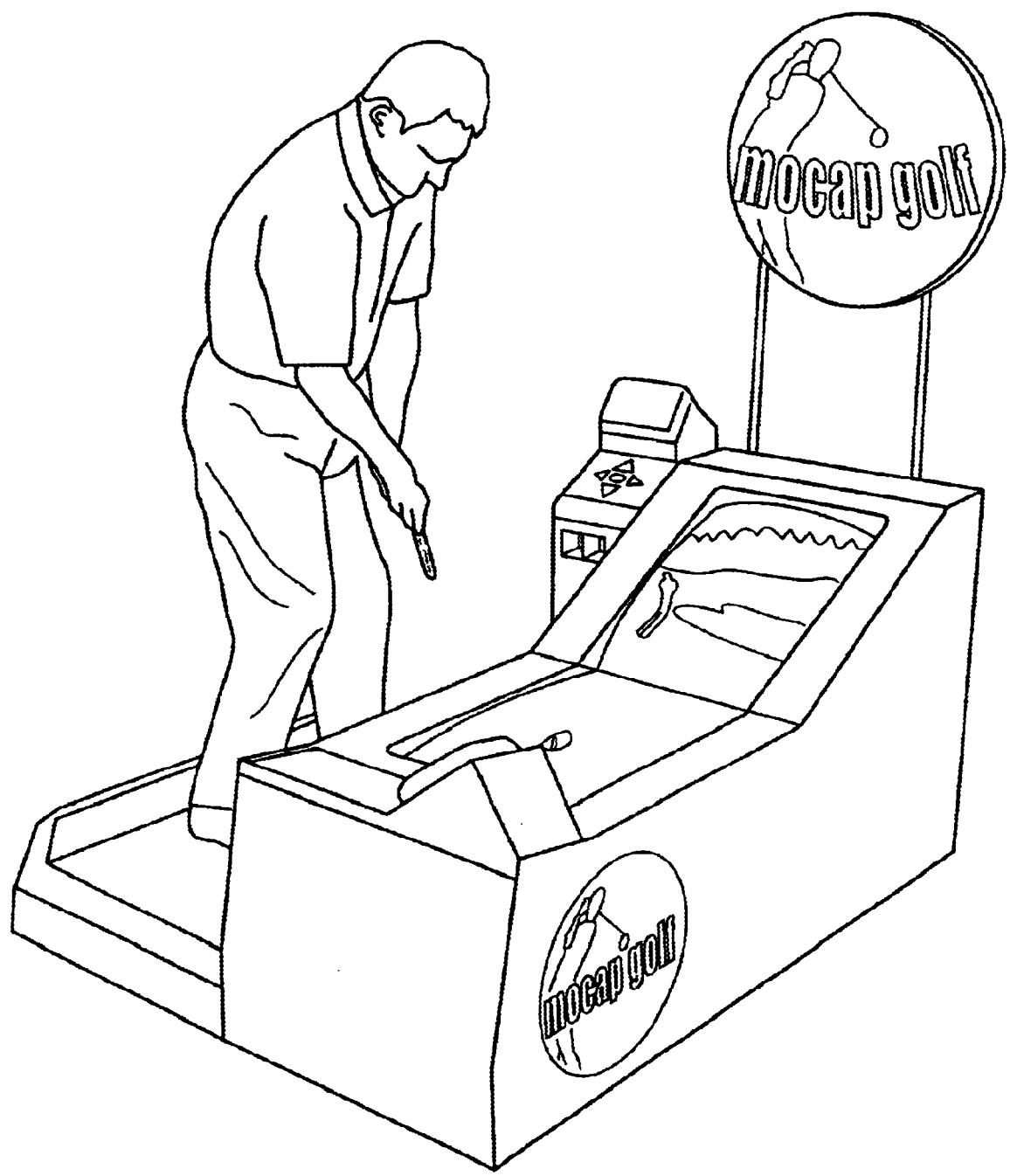
FIG. 4 shows the player playing the golf game system illustrated in FIG. 2.

Next, an overview of a golf game played on the golf game system 2000 will be explained using FIGS. 1 and 4 to 24. FIG. 4 shows a player playing the golf game. In this golf game, utilizing the grip 200, the player, as shown in FIG. 4, swings the grip 200 in order to hit a golf ball within the game space G with a virtual golf club (hereinafter, refer to as a virtual club). The virtual club is composed of the virtual grip (virtual contact unit), virtual head (virtual operation unit) and virtual shaft. The virtual grip in the game space G represents the grip 200. The virtual head and the golf ball are displayed on the monitor 101a as well as the underfoot view from the viewpoint of the virtual player within the game space G. The movement of the virtual head follows the movement of the grip 200 as if it is connected with the grip 200 by an invisible shaft. A front view from the viewpoint of the virtual player is displayed on the monitor 101b. "Front" means the direction in which the golf ball should be hit. On the monitor 101b, the number of the hole being played, the par number of the hole, the player's score (hereinafter, referred as to life), the distance between the position of the golf ball and a green, how many players are playing, the order of the player within a group, and the like are displayed as well.

Prior to beginning the game, the player may select the number of players who will join the game and may also select the difficulty level of the courses. The virtual player goes around each hole within the game space G under the control of the golf game system 2000. The player's initial life at each hole is set, for example, to be three points, and his life increases or decreases in accordance with the performance at each hole. In this golf game system 2000, time limit for one shot is set in order to progress the golf game smoothly. If the time that was spent with a shot is over the time limit, one point is deducted from the player's life. FIG. 5 shows an example of how to count the performance of the player in the golf game system 2000. The conversion table in FIG. 5A shows that one bogey is converted to minus one point, double bogey is converted to minus two points, one birdie is converted to plus one point, and an eagle is converted to plus two points. The player's performance at each hole (hereinafter, score) is converted into score points and is added to the player's life. FIG. 5B shows the player's life at each hole is the sum of the score points, the time deduction points and the initial life. FIG. 5B shows the total points, that is the sum of the life, at each hole decides the game.

3-1 Coordinate Conversion

Figure 6:
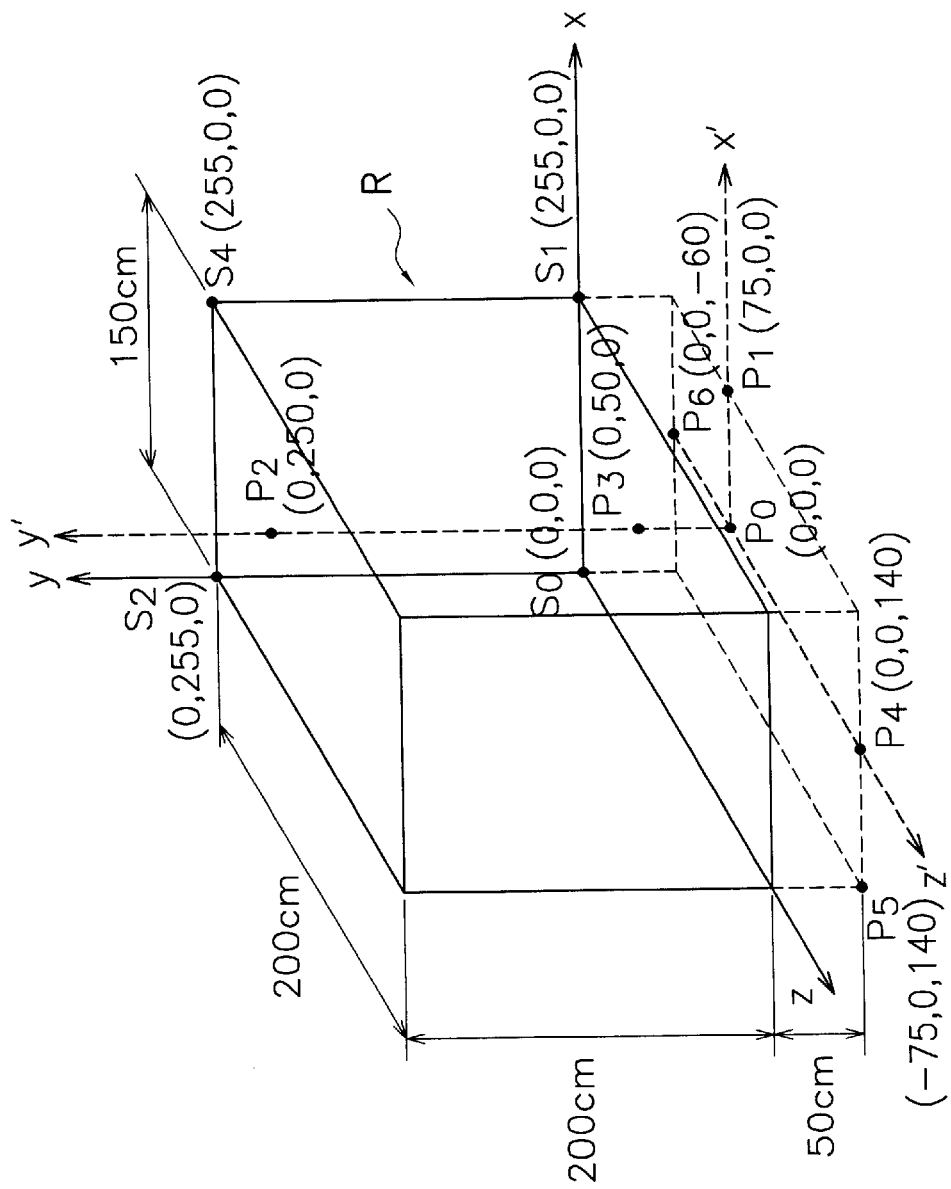
FIG. 6 shows the relationship between a sensor coordinate system and a player coordinate system in the golf game illustrated in FIG. 2.
Figure 7:
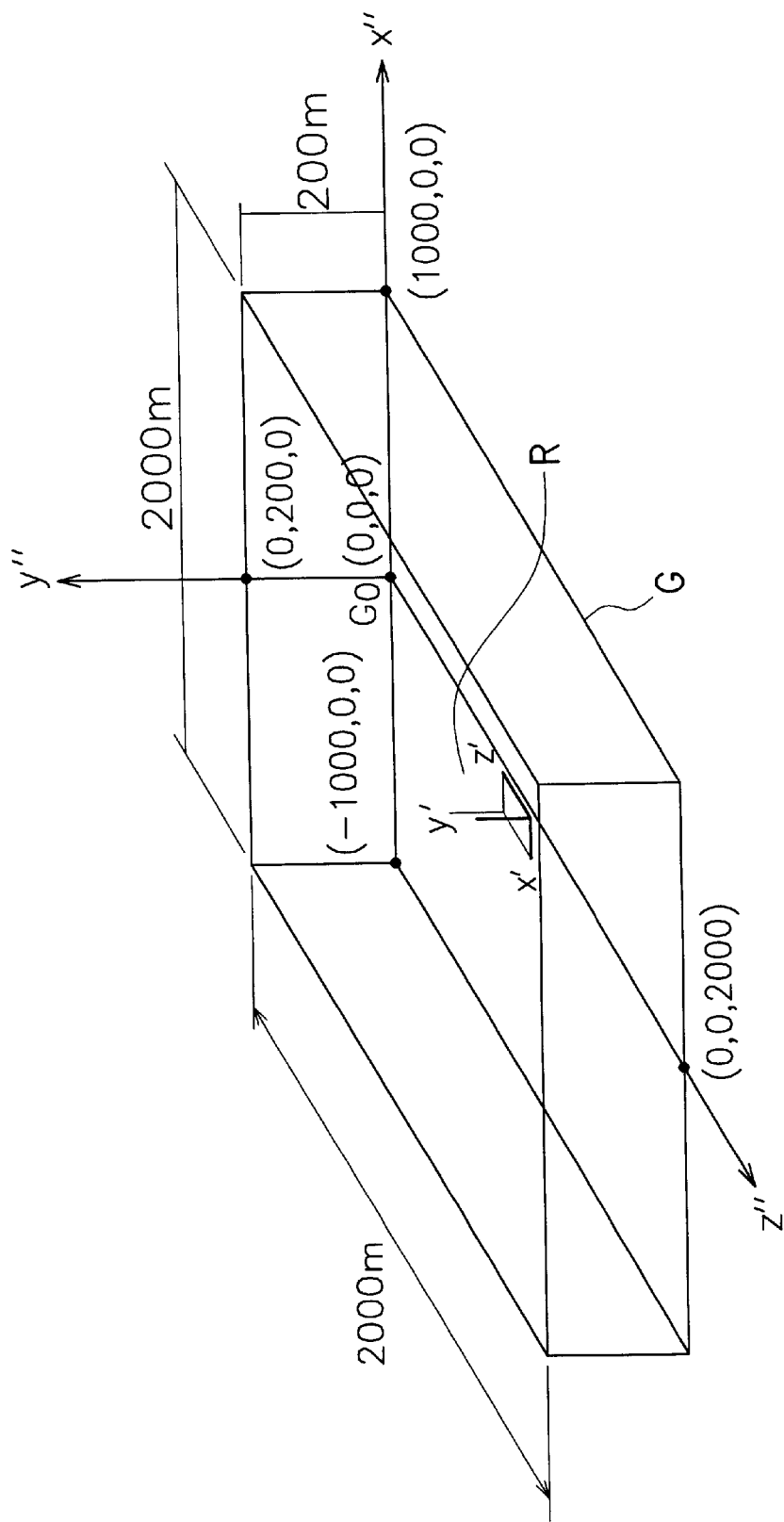
FIG. 7 shows the relationship between the player coordinate system and a game space coordinate system in the golf game system illustrated in FIG. 2.

FIGS. 6 and 7 show the coordinate conversion concept utilized for the golf game system 2000. Three-spatial coordinate systems are assumed in the present golf game system 2000. The first is a sensor coordinate system that utilizes the light sensors 102a and 102b as references to establish the position within the real space R with three-dimensional coordinates. The second is a player coordinate system that utilizes the player as a reference to establish the position within the real space R in three-dimensional coordinates. The third is the game space coordinate system that establishes the position within the game space G in three-dimensional coordinates.

3-1-1. Conversion From a Sensor Coordinate System Used in the Real Space R to a Player Coordinate System FIG. 6 shows the relationship between the sensor coordinate system and the player coordinate system. A cuboid whose boundaries are detectable with the light sensors 102a and 102b is assumed to be the real space R. The cuboid assumed as the real space R in the present example hovers 50 cm above the floor surface, which is the height of the foot marks 109. The real space R also comes in contact with the light sensors 102a and 102b, and is disposed on the front of the game device 100. The height of the cuboid is 200 cm, the depth is 200 cm, and the width is 150 cm. The size of the cuboid is set to be within the sensing capability of the light sensors 102a and 102b, and to be large enough to accommodate a player's movements.

The sensor coordinate system will be explained first. The sensor coordinate system is a system of coordinates in which a vertex $S_0$ corresponding to light sensor 102b is the origin, an imaginary line that extends from the light sensor 102b to the light sensor 102a is the x-axis, an imaginary line that extends up from the light sensor 102b is the y-axis, and an imaginary line that extends out from the front of the game device is the z-axis. Each edge of the cuboid representing the real space R in the sensor coordinate system is divided into 256 spaces, whose coordinates are expressed as values from 0 to 255. For example, the coordinates of the vertex $S_1$, which corresponds to light sensor 102b, will be (255, 0, 0) in this system.

Next, the player coordinate system will be explained. In this example, the origin $P_0$ in the player coordinate system is a position in the middle of the foot marks 109. Assume, for example, that the position is at the front of the game device 100, 60 cm further to the front of the game device, and 50 cm from the floor surface. Then, an x'-axis, a y'-axis, and a z'-axis extend in the same respective directions as the x-axis, y-axis, and z-axis in the foregoing sensor coordinate system. Each coordinate axis is scaled with 1 cm increments. In this player coordinate system, the coordinates of a point $P_3$ where the y'-axis intersects with the lower plane of the real space R will be (0, 50, 0). Likewise, the coordinates of a point $P_2$ where the y'-axis intersects with the upper plane of the real space R will be (0, 250, 0).

As an example in which sensor coordinates are converted into player coordinates, consider the origin $S_0$ in the sensor coordinate system. The sensor coordinate system origin $S_0$ (0, 0, 0) will be expressed as (−75, 50, −60) in the player coordinate system. Likewise, the sensor coordinate system vertex $S_1$ (255, 0, 0) that corresponds to the light sensor 102a will be expressed as (75, 50, −60) in the player coordinate system.

3-1-2. Conversion From the Player Coordinate System to the Game Space Coordinate System FIG. 7 shows the relationship between the player coordinate system and the game space coordinate system. The game space G is a virtual space in which the golf game is played, such as a virtual golf course or other area, and is a predetermined size that is set by the golf game supplier. A hypothetical game space G might be a cuboid 2000 m wide, 2000 m deep and 200 m high, for example. Taking the origin $G_0$ (0, 0, 0) to be in the middle of one of the lower edges of the cuboid, an x"-axis extends along the lower edge of the cuboid in which the origin $G_0$ is placed, a z"-axis extends perpendicular to the x"-axis and along the bottom of the cuboid, and a y"-axis extends upward perpendicular to the x"-axis and the z"-axis. Each coordinate axis is scaled with 1 m increments.

The relationship between the player coordinate system and the game space coordinate system is that the y'-axis and the y"-axis extend in the same direction, while the x'-axis and the x"-axis, and the z'-axis and the z"-axis, both extend in a parallel, but opposite, direction with respect to each another. The origin $G_0$ in the game space coordinate system and the origin $P_0$ in the player coordinate system are the same when the game starts. Thereafter, the virtual player hits the golf ball, goes around the course and advances or turns, the origins in the game space coordinate system and the player coordinate system gradually diverge. When the two origins are equal, the coordinates (−75, 50, −60) in the player coordinate system, which is the origin $S_0$ in the sensor coordinate system, will be (75, 250, 60) in the game space coordinate system. It should be noted that the conversions described above for the coordinate systems are no more than a single example, and the coordinate system conversions can be generally performed utilizing a known method as an affine transformation.

In the present golf game system 2000, the positions of the point Q on the tip of the grip 200 in the real space R is specified in the sensor coordinate system, and these coordinates are subsequently converted into the player coordinate system (Q') and further into the game space coordinate system (Q"). Moreover, the position where a straight line intersects with the ground with in the game space G is specified. The line goes though the position Q" and is at an inclination angle φ with x"-y" plane. The display position of the virtual head on the monitor 101a is determined by making a perspective-projection transformation of the coordinates in the game space coordinate system, and the virtual head is then displayed. This coordinate conversion allows a player to play a golf game without sensing incongruity between real space and the game space, while he feels an invisible shaft extends from the grip 200 in his hand and connects with the virtual head displayed.

3-2 Processes Performed by the CPU

Referring again to FIG. 1, the process which the CPU 10 performs will be now explained. The CPU 10 includes player number selection means 11, course selection means 12, display control means 13, club section means 14, head display means 15, hit determination means 16, sound control means 17, and status determination means 18.

Between 1 and 4 players can be selected with the player number selection means 11. FIG. 8 is an example of a player number selection screen that the player number selection means 11 displays. The player selects the number of the players by pushing the buttons 106 installed on the game device 100.

Figure 9:
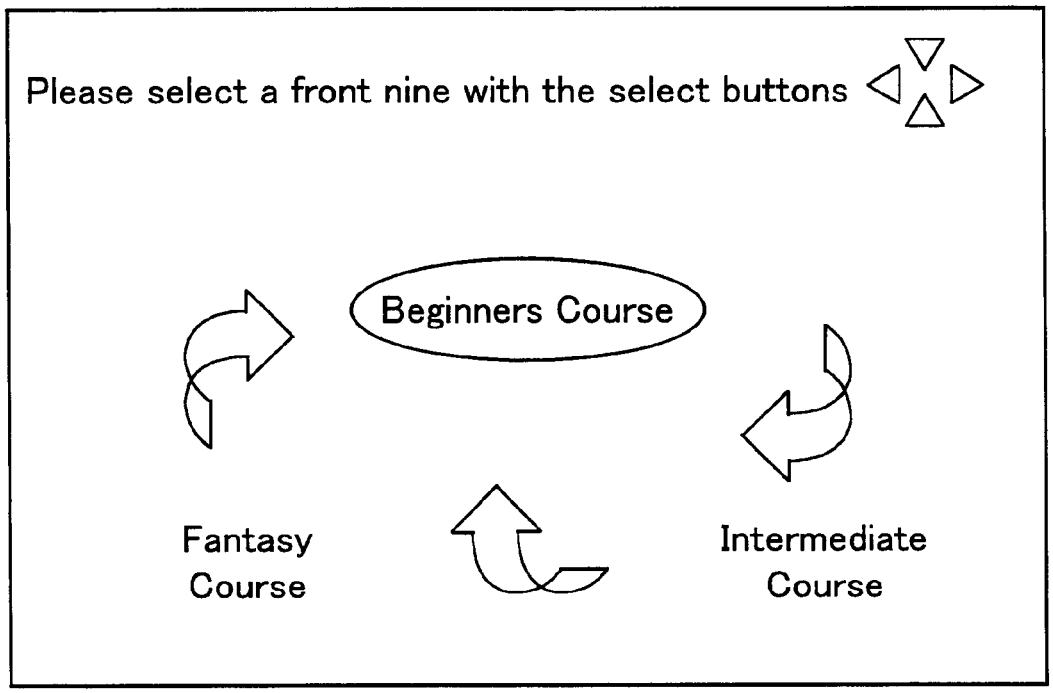
FIG. 9 is an example of a course selection screen displayed in the golf game system illustrated in FIG. 2.

A course which corresponds to the difficulty level is selected with the course selection means 12. FIG. 9 shows an example of a course selection screen that the course selection 12 means displays. The selection of the course is performed with the buttons 106 installed on the game device 100. This figure shows that a beginner course is selected. The courses within the game space G (not shown) are stored in the ROM 18.

Figure 10:
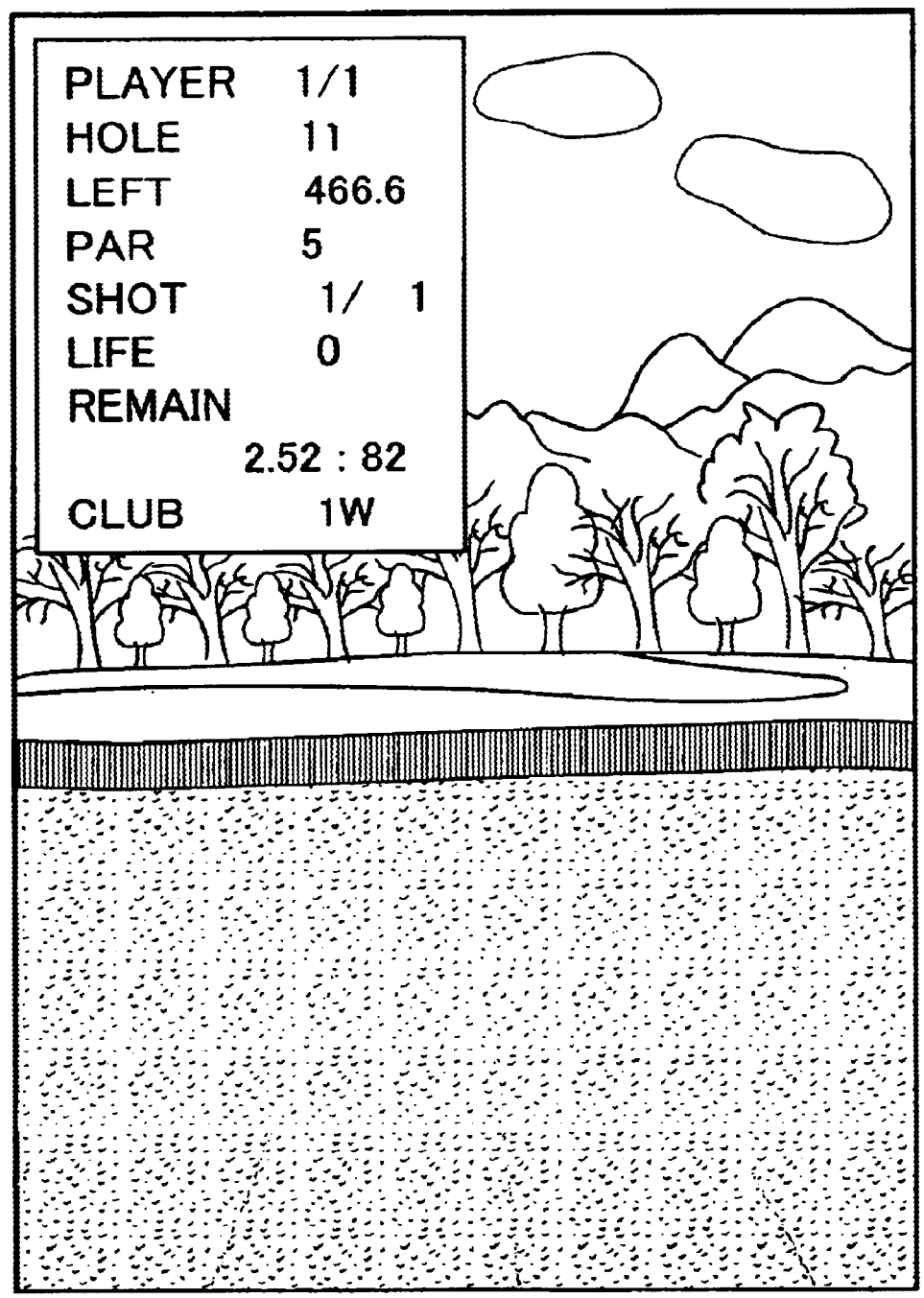
FIG. 10 is an example of a front view screen displayed in the golf game system illustrated in FIG. 2.
Figure 11:
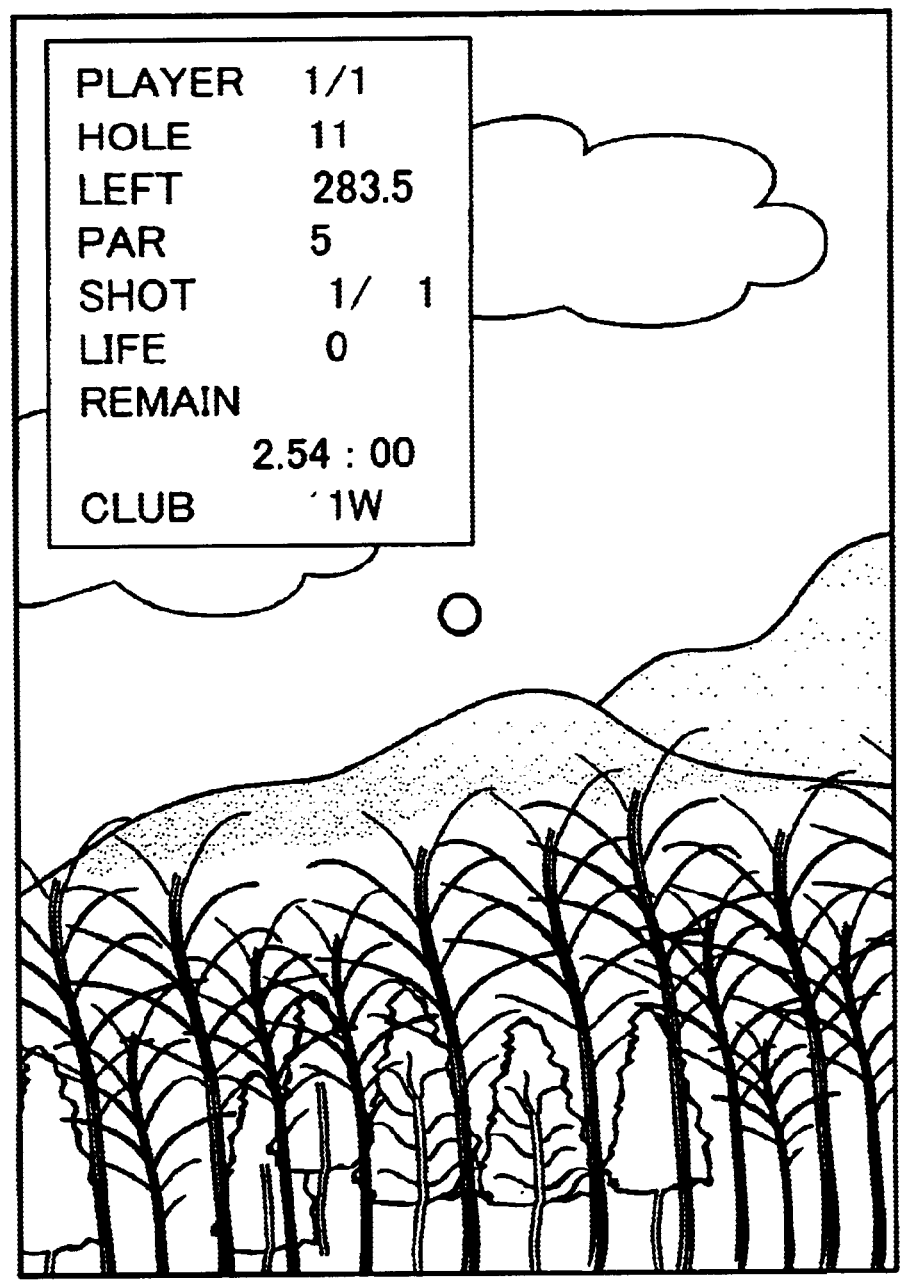
FIG. 11 is an example of another front view screen displayed in the golf game system illustrated in FIG. 2, in which a golf ball is hit and goes airborne.
Figure 12:
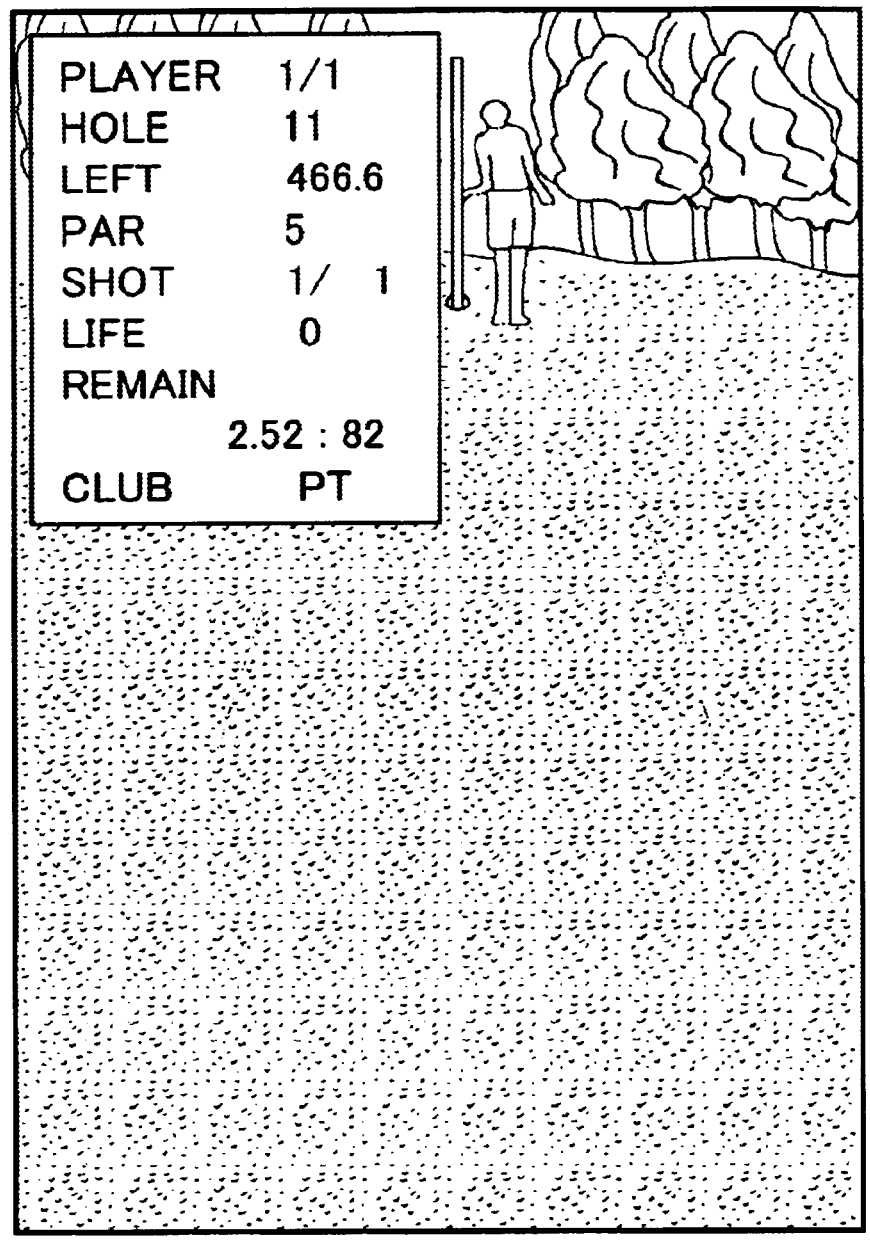
FIG. 12 is an example of another front view screen displayed in the golf game system illustrated in FIG. 2, in which the front view is toward a cup from the viewpoint of a virtual player on a green.
Figure 13:
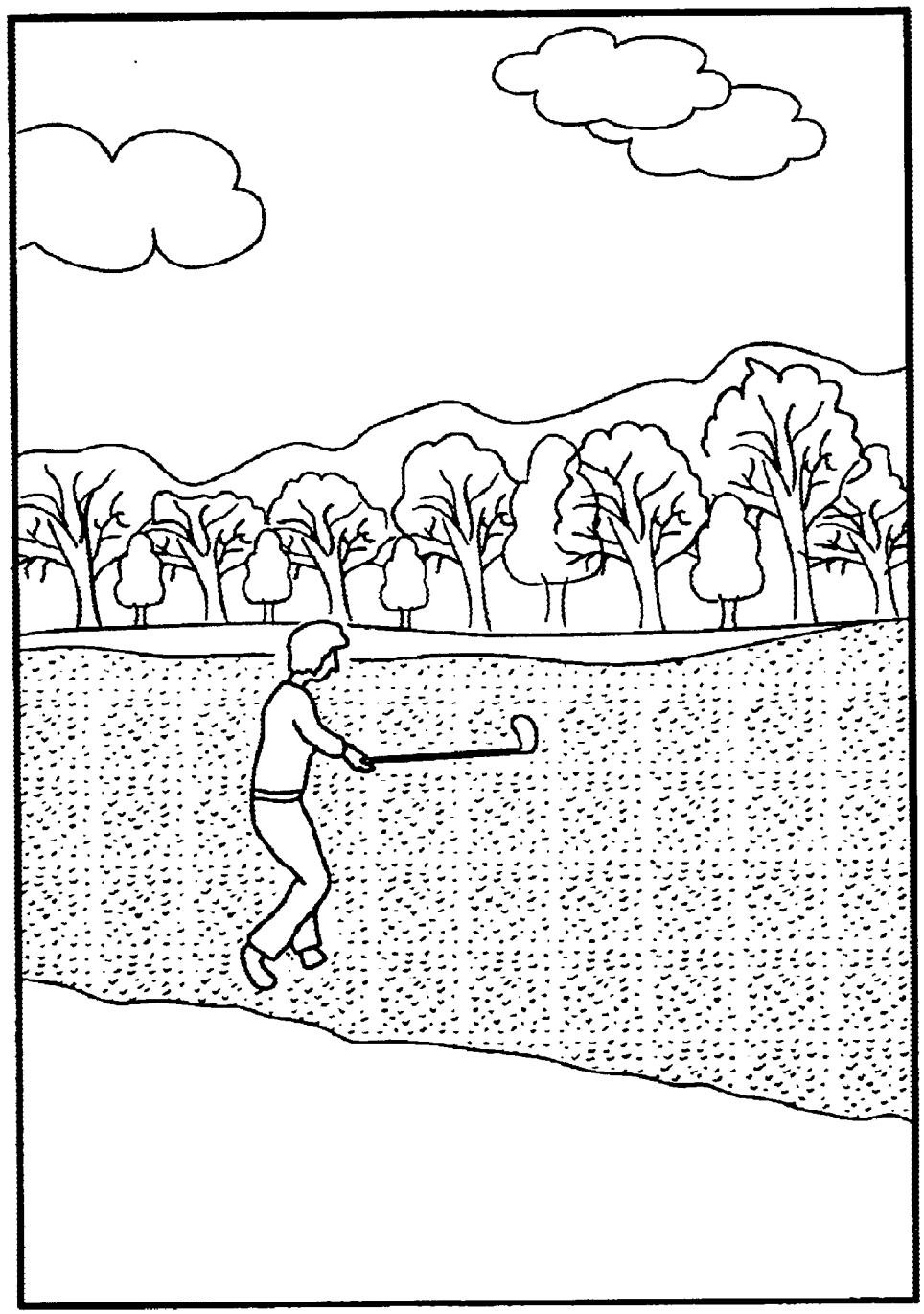
FIG. 13 is an example of a screen displayed in the golf game system illustrated in FIG. 2, in which a player at a mid-point of a course is playing.

The display control means 13 displays views, on the monitor 101a and 101b, from the game space coordinates (virtual position) of the virtual player. The monitor 101b basically displays a front view from the viewpoint of the virtual player within the game space G (virtual view point). The virtual position of the virtual viewpoint is specified based on the virtual point of the virtual player. The image data for the front view can be generated based on the data that compose the game space G. FIG. 10 shows an example of a front view screen. This screen shows a front view spreading out in front of the virtual player on a tee. FIG. 11 shows another example of a front view screen, which enlarges a flying golf ball and the scenery around the ball. FIG. 12 shows another example of a front view screen in which a view spreading out in the direction of a cup from the virtual player on a green is displayed. FIG. 13 is an example of a screen that displays the scenery the virtual player plays in the middle of the course. In this way, playing scenery, in which the virtual player representing the player plays, can be displayed as well as the scenery of the course. Displaying the playing scenery when the virtual player moves to the next course helps the player to understand his position in the course and to have a feeing that he is actually going around the course.

Figure 14:
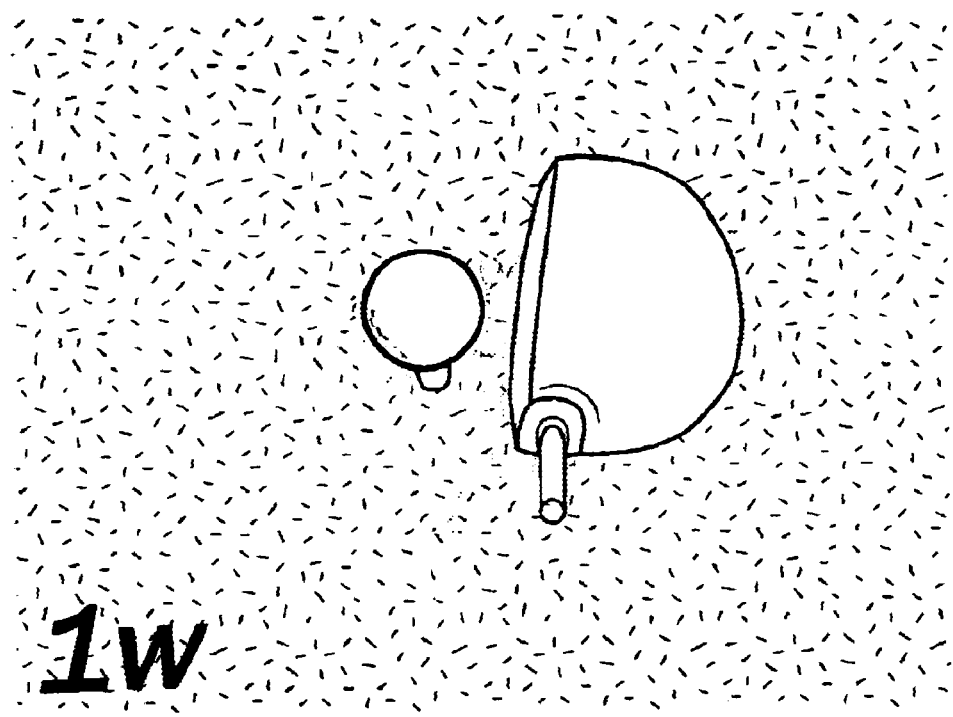
FIG. 14 is an example of an ordinary underfoot view displayed in the golf game system illustrated in FIG. 2.
Figure 15:
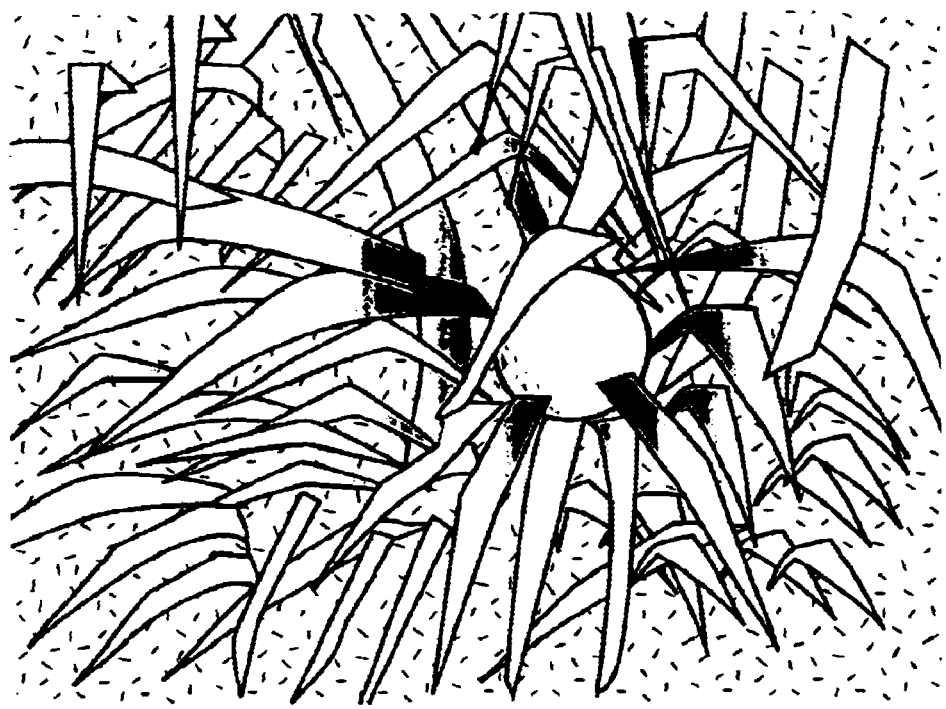
FIG. 15 is an example of an underfoot view of the rough displayed in the golf game system illustrated in FIG. 2.
Figure 16:
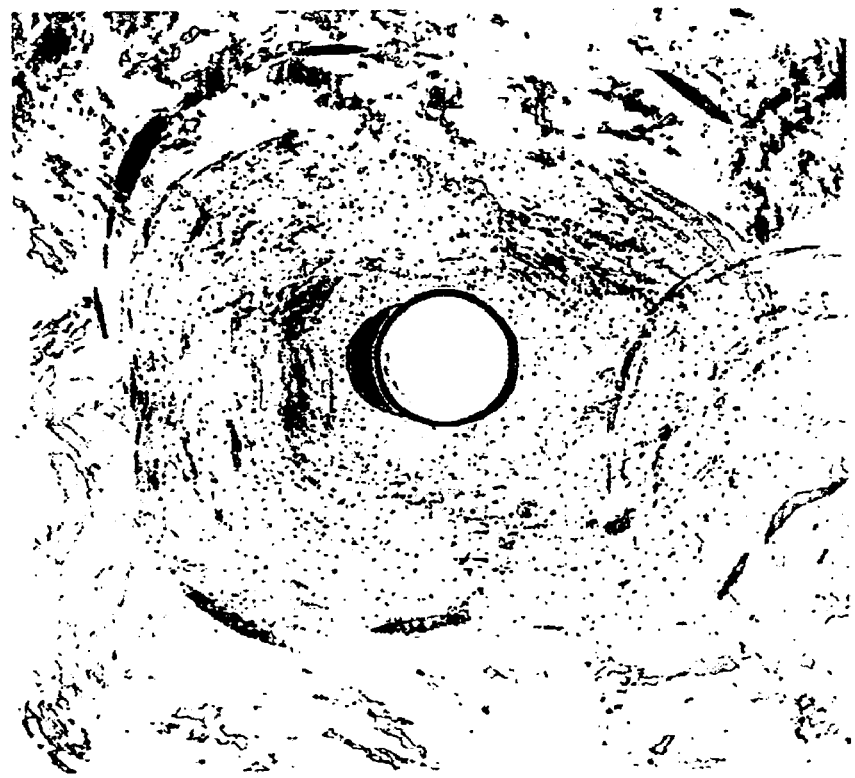
FIG. 16 is an example of an underfoot view of a bunker displayed in the golf game system illustrated in FIG. 2.

The monitor 101a displays a view at the foot of the virtual player. This underfoot view is from the virtual viewpoint of the virtual player. The image data for an underfoot view can be generated based on the data composing the game space G. However, an underfoot view is much finer than a front view in the real world. On the other hand, the resolution of an underfoot view that is generated with the game space data is almost same as that of a front view. Accordingly, that kind of underfoot view seems to be rougher than the underfoot view that a player sees in the real world. This lessens the feeling of reality for a player. Thus, it is preferable that image data for an underfoot view whose resolution is higher than that of the front view are stored in the ROM 18 in advance, and the monitor 101a outputs the image data. FIG. 14 shows an example of an underfoot view screen which displays the standard view. FIG. 15 shows another example of an underfoot view screen which displays a rough view. FIG. 16 shows another example of an underfoot view screen which displays a bunker view. The standard view is displayed when the virtual player is on a fairway or a green. The rough view is displayed when the virtual player is in the rough. The bunker view is displayed when the virtual player is in a bunker. As shown in FIGS. 14 to 16, a plurality of underfoot views corresponding to the ground on which the ball lies within the game space G are preferably stored in the ROM 18.

Figure 17A:
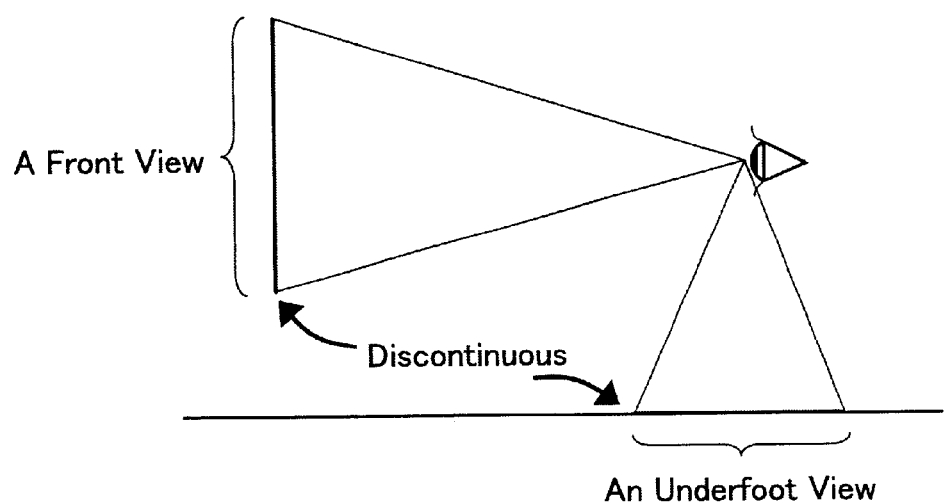
FIGS. 17A and 17B show how to correct a front view in situations in which the front view from the virtual viewpoint is far from the virtual player.
Figure 17B:
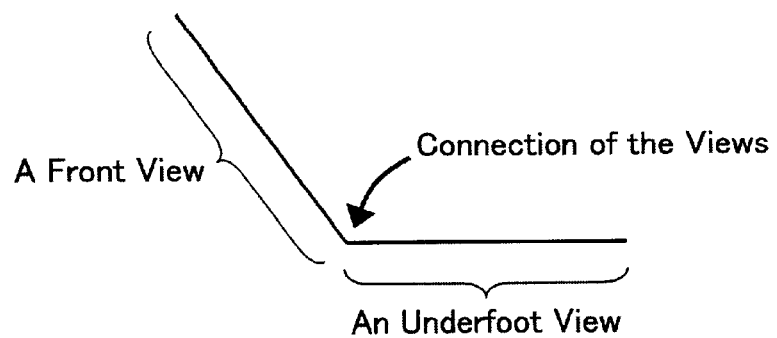
Figure 18A:
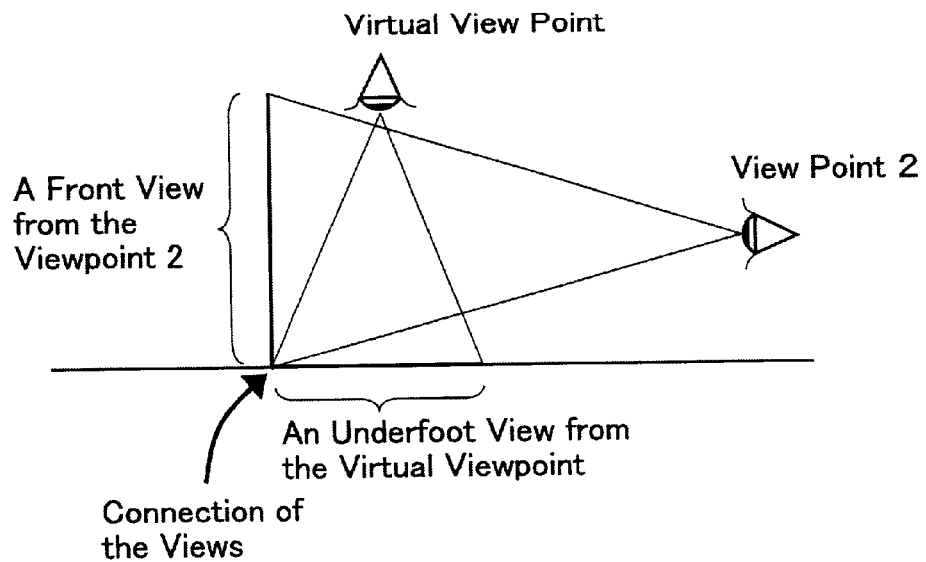
FIGS. 18A and 18B show how to correct a front view in situations in which the front view from the virtual viewpoint is close to the virtual player.
Figure 18B:
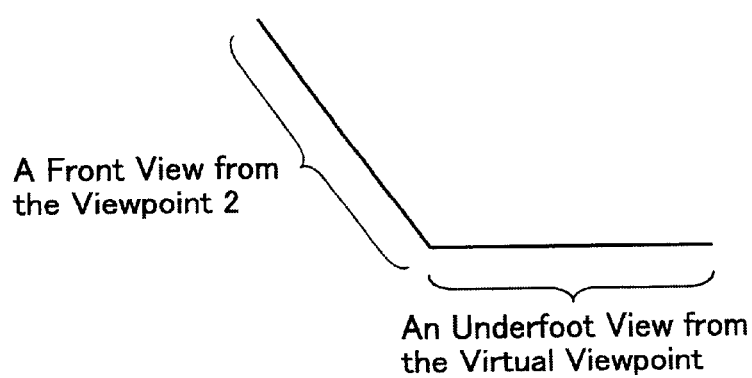

The display control means 13 switches display modes whether a front view is far from or close to the virtual player. More specifically, the display control means 13 corrects a front view if it is close to the virtual player so that the player will not feel incongruity with an underfoot view and a front view that are connected. FIG. 17 shows how to display views when a front view from the virtual viewpoint is far from the virtual player. An example of a far front view is a front view that spreads out in the direction of a green from the virtual viewpoint of the virtual player who stands on a tee. FIG. 17A shows the front view from the virtual viewpoint is not continuous with the underfoot view from the virtual viewpoint. FIG. 17B shows the two discontinuous views are connected and are displayed on the adjacent monitors 101a and 101b. The monitor 101b displays the front view, and the monitor 101a displays the underfoot view. Take, for example, a situation in which a virtual player on a tee addresses the ball, aims at the direction of a green, and hits the golf ball at his feet. He will not sense incongruity with the gap between the two views displayed on the monitor 101a and 101b that are initially discontinuous. FIG. 18 shows a display control means 13 that corrects a front view that is close to the virtual player. Take an example of a close front view, for example, that spreads out in the direction of a cup from the virtual viewpoint of the virtual player standing on a green. In the real world, a player on a green hits a golf ball so as to get it on a straight line that connects the golf ball at his feet with the cup. Accordingly, the player will sense incongruity if a front view and an underfoot view are not continuous since he will not be able to aim at the straight line connecting the golf ball at his feet with the cup. If the two views were not connected, the golf ball hit by a player goes out of the underfoot view and appears again in the front view after a short time. This situation brings the player incongruity. In order to avoid this situation, the display controlling means 13 displays a front view in the direction of a cup that connects with an underfoot view at the foot of the virtual player. FIG. 18A shows that an underfoot view from the virtual viewpoint connects with a front view from the virtual viewpoint 2. The viewpoint 2 is located backward from the virtual viewpoint. FIG. 18B shows that the front view from the viewpoint 2 is displayed on the monitor 101b and the underfoot view from the virtual viewpoint is displayed on the monitor 101a. As explained above, the display control means 13 switches the view-display modes for displaying views on the two monitors 101a and 101b in accordance with whether a front view is far from or close to the virtual player. This switching allows the player to enjoy the true charm of golf, in that he aims at a certain direction in which a golf ball should fly and hits the ball at his feet, without sensing incongruity between the views on the two monitors.

The kind of the virtual club used can be selected with the club selection means 14. The selection is performed with the buttons 106 installed on the game device 100. Pushing an up button or a right button changes the virtual head from, for example, a 1-wood to 2-wood, 3-wood, etc. Pushing a down button or a left button changes the virtual head from a 3-wood to a 2-wood, 1-wood, etc. The virtual club selection allows a player to enjoy the true charm of golf in that he can play with his favorite golf club. Who uses what kind of virtual club is preferably stored in the RAM 19 and is displayed on the monitor. The foregoing FIG. 14 shows that the player has selected a 1-wood.

Figure 19:
FIG. 19 shows a head position table in the golf game system illustrated in FIG. 2.

The head display means 15 specifies the game space coordinates (virtual position) of the virtual head and a twist angle of the virtual head. The game space coordinates of the virtual head will be explained first. The head displaying means 15 carries out a coordinate transformation process that converts the sensor coordinates of the light-emitting unit 205 installed in the grip 200 into player coordinates, and then into game space coordinates. The game space coordinates Q" of the light-emitting unit 201 (herein after, referred as to the game space coordinates Q" of the grip 200) is stored in the RAM 19 temporarily. In addition, the head displaying means 15 specifies the inclination angle of the grip 200 based on the acceleration data outputted from the acceleration sensor 202 in the grip 200. The inclination angle $\phi$ of the grip 200 is an angle at which the grip 200 and x-z plane in the real space R are. The game space coordinates of the virtual head turns out to be a position where a straight line having the inclination angle $\phi$ intersects with the ground in the game space G, wherein the straight line goes through the game space coordinates Q" of the grip 200. The game space coordinates of the virtual head are stored in the RAM 19. FIG. 19 shows a head position table stored in the RAM 19. This table stores the game space coordinates of the virtual head in a time series of a predetermined time period interval $\Delta t$.

Figure 20:
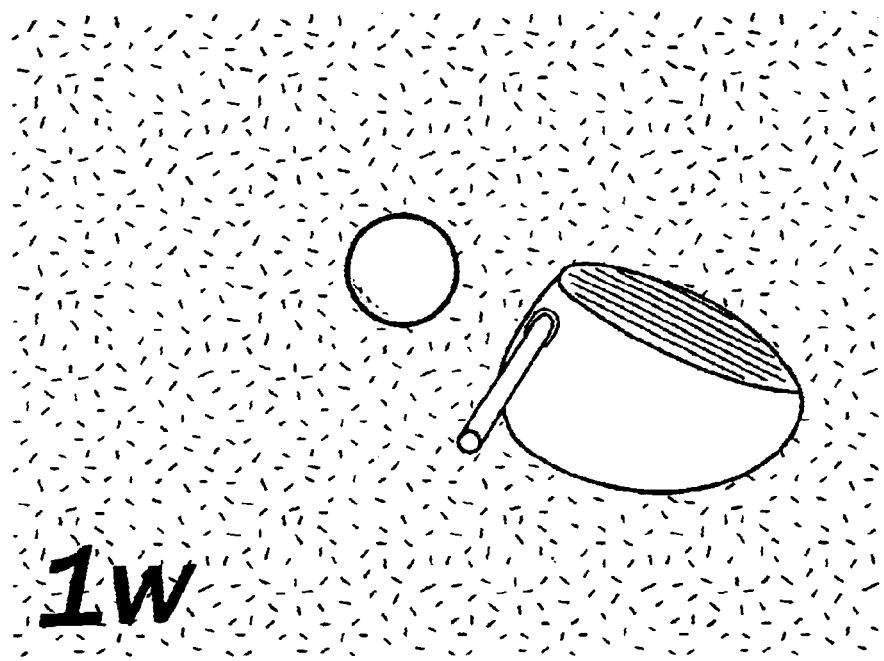
FIG. 20 is an example of a head display screen displayed in the golf game system illustrated in FIG. 2, in which the player has twisted the grip-type interface drive and the head of a driver follows it.
Figure 21:
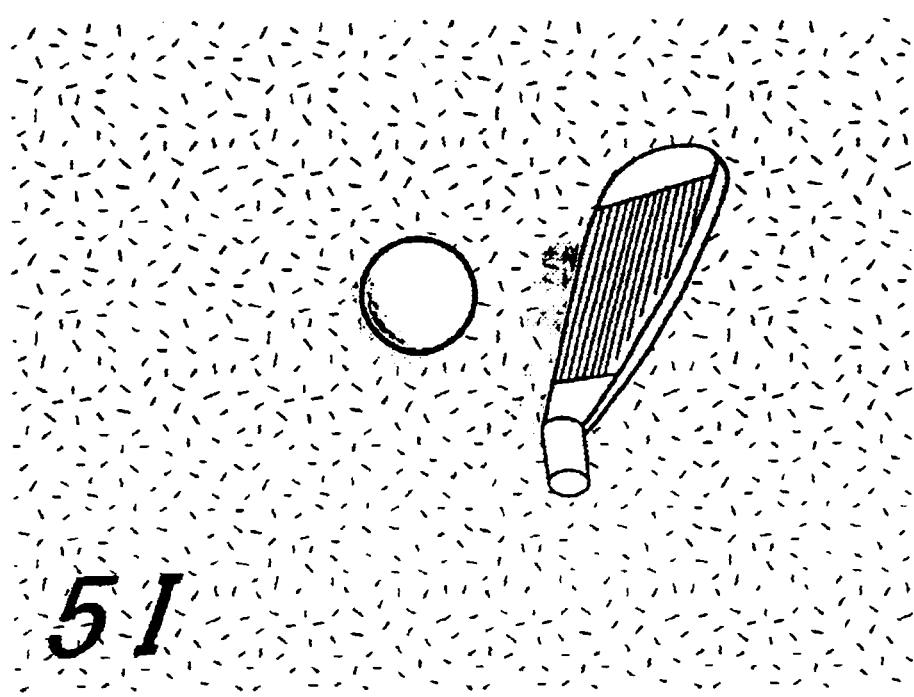
FIG. 21 is an example of anther head display screen displayed in the golf game system illustrated in FIG. 2, in which the player has twisted the grip-type interface device and the head of a 5-iron follows it.
Figure 22:
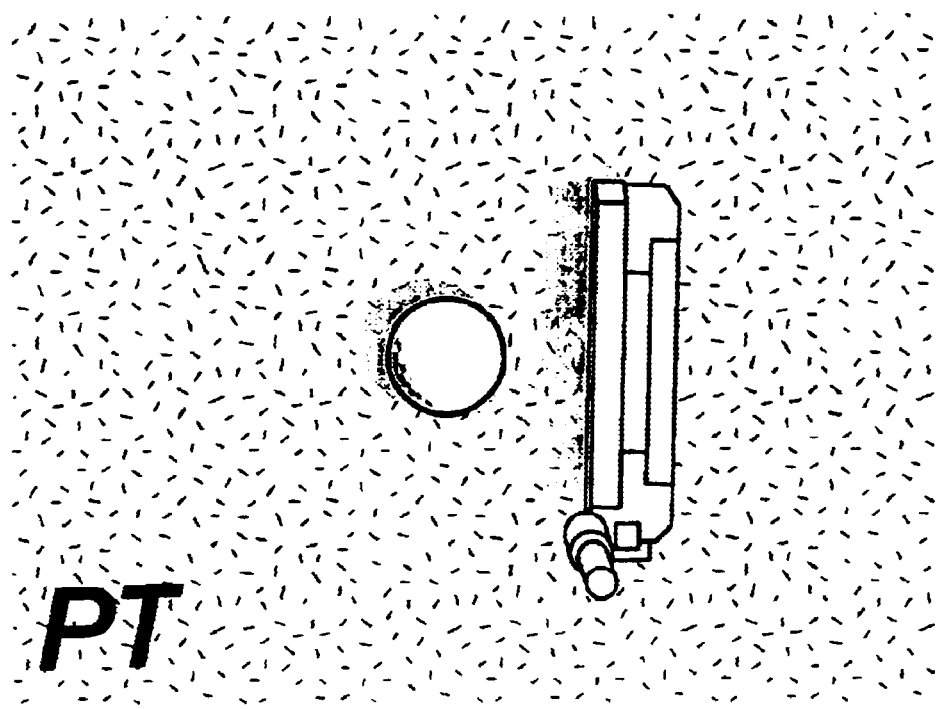
FIG. 22 is an example of another head display screen displayed in the golf game system illustrated in FIG. 2, in which the player has not twisted the grip-type interface device and the head of a putter follows it.

Next, the twist angle will be explained. The head displaying means 15 specifies a twist angle $\theta$ of the grip 200 based on the acceleration data outputted from the acceleration sensor 202. The twist angle $\theta$ is an angle at which the grip 200 rotates from the standard position around its longitudinal axis. The standard position is a position at which the inclinations of the grip 200 against the x, y, and z axes have certain values. The virtual head of the selected virtual club is displayed by making a prospective-projection transformation based on the game space coordinate of the virtual head and the twist angle $\theta$. The above-mentioned FIG. 14 shows an example of a screen that displays a virtual head when a player addresses and holds the grip 200 at the standard position (the twist angle $\theta$=0). When the twist angle $\theta$ is zero, the face of the virtual head is almost perpendicular to the direction in which the golf ball should be hit. FIG. 20 shows an example of a screen that displays a virtual head of a 1-wood when a player holds and twists the grip 200 around the axis of the grip clockwise. FIG. 21 shows an example of a screen that displays a virtual head of a 5-iron when a player twists the grip 200 a little. FIG. 21 shows that the virtual head displayed on the monitor rotates corresponding to the twist of the grip 200. FIG. 22 shows an example of a screen that displays a virtual head of a putter when a player holes without twisting the grip 200.

The head displaying means 15 specifies the game space coordinate Q" of the virtual head and obtains the twist angle θ' at predetermined time intervals, e.g. every 1/60 sec. Accordingly, the movement of the virtual head controlled by the movement of the grip 200 that the player manipulates is displayed on the monitor 101*a*. This enables a player to swing the grip 200 with the feeling that an invisible shaft extends from the grip 200 and connects with the virtual head.

On the other hand, a player will sense incongruity if the virtual head is displayed as if it were always in contact with the ground. The head displaying means 15 carries out the following process. The longer the distance between the x"-z" plane position of the virtual head and the player becomes, the higher the position of the virtual head in the y" axis direction becomes. In other words, the head displaying means 15 raises the virtual head upward in the game space G. In order to carry out this process, the head display 15 calculates the game space coordinates of the virtual head by utilizing the length of the virtual club which is determined for every kind of virtual club in advance. For example, if the player inclines the grip 200 so that he can raise the virtual head, the virtual head is displayed as if it hovering above the ground.

Figure 23:
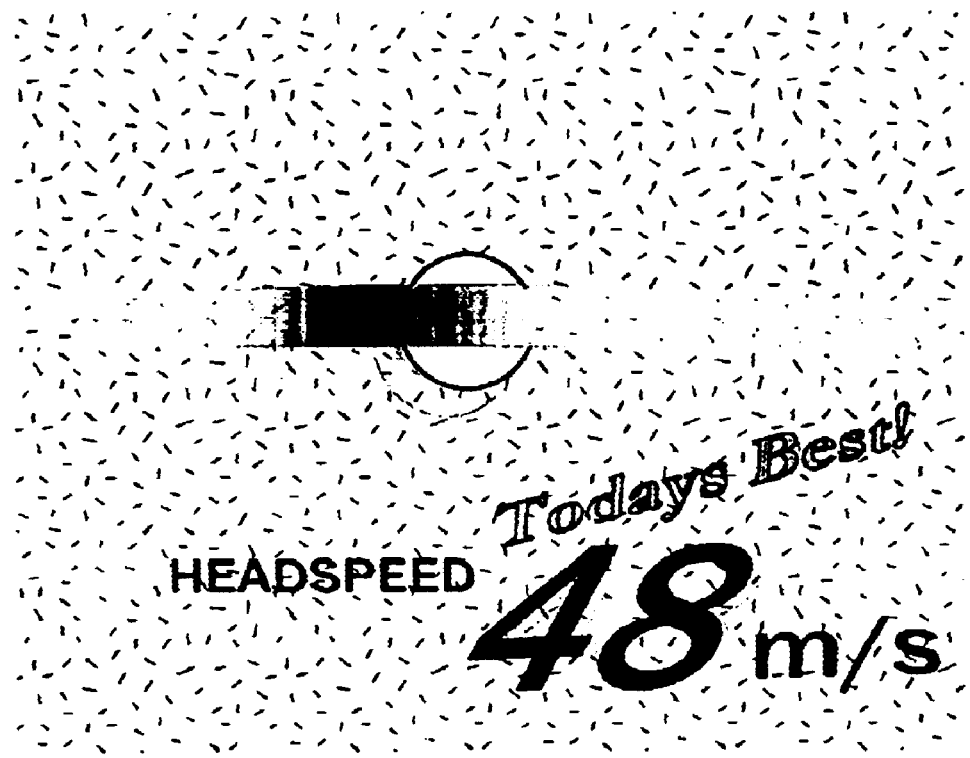
FIG. 23 is an example of a screen displayed in the golf game system illustrated in FIG. 2, in which the trajectory and speed of the virtual head is displayed.

In addition, the head display means 15 may display the trajectory of the virtual head. FIG. 23 shows an example of a screen that displays the trajectory and the speed of the virtual head. The head display means 15 specifies the trajectory of the virtual head based on the game space coordinates of at least two positions that are on the passage line of the virtual head. The speed of the virtual head may also be specified based upon the changes of the game space coordinates of the virtual head and displayed.

The hit determination means 16 determines whether the player hits a golf ball. This determination may be carried out based on whether the game space coordinates of the virtual head and those of the golf ball come together. However, the determination is precise, and the player will often swing and miss, and will lose interest in the golf game. In particular, hitting the golf ball as hard as one can by swinging a driver seems to cause the problem. On the other hand, to detect any movement of the player and to reflect it in the golf game brings about results that the player may not have intended. Accordingly, it is preferable to distinguish whether the player is intentionally making a swing in order to carry out proper processes in accordance with the determination. In the present golf game system 2000, the following process for determining the player's intent is employed.

FIG. 24 shows an example of how to determine whether the golf ball is hit. FIG. 24A shows the concept of hit determination when the virtual club is wood. Suppose that an imaginary circle extends around a golf ball within the game space G, the radius of the circle is r1, and the area of the circle defines the hit area. The hit determination means 16 determines that the player is addressing the ball when a stay time is equal to or greater than the prescribed stay time Ts1. The stay time is a time period during which the virtual head is in the hit area. The hit determination means 16 determines that the player has hit the golf ball when the following four conditions are satisfied. (1) The virtual head goes out of the hit area after address, (2) the virtual head goes out of the hit area and passes through the hit area after address, (3) the time required for the virtual head to pass through the hit area is less than or equal to the prescribed passage time Tp, (4) the twist angle θ during address is in the range of the prescribed twist angle, in other words, θ1≦θa≦θ2. FIG. 24D shows the prescribed range of twist angle θa at address. The values of θ1 and θ2 are set in consideration of the twist angle of the face when a real golf player fades or draws. The twist angle θa at address may be the average value of the twist angle θ whose value changes while the virtual head is in the hit area.

On the other hand, the hit determination means 16 determines that the player swung and missed if the distance between the trajectory of the virtual head and the golf ball is equal to or greater than the prescribed distance d1 (d1<r1). The hit determination means 16 carries out parallel translation of the trajectory so that the trajectory goes through the golf ball when the swing gap is less than the prescribed distance d1. The parallel translation is along the longitudinal direction of the monitor 101*a*. If the value of the prescribed distance d1 is too high, it will bring the player incongruity.

Figure 24A:
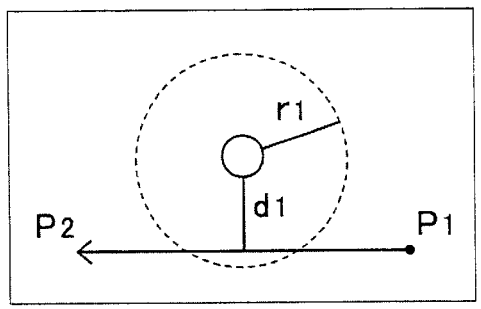
FIGS. 24A, 24B, 24C, and 24D show how to determine whether the virtual golf club has hit the golf ball.
Figure 24B:
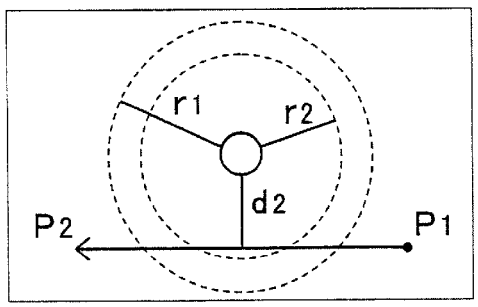
Figure 24C:
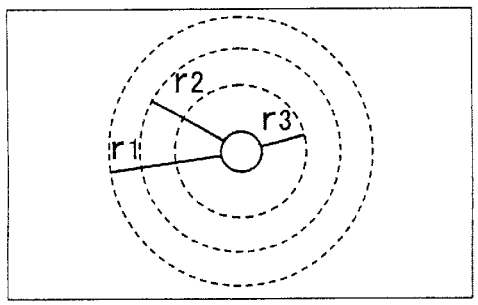
Figure 24D:
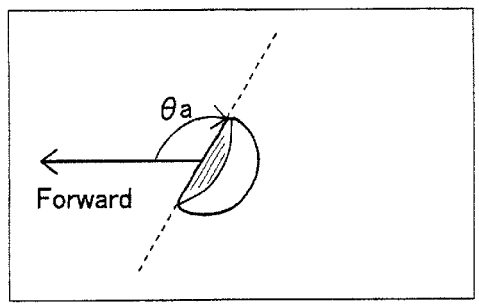
Figure 24D:
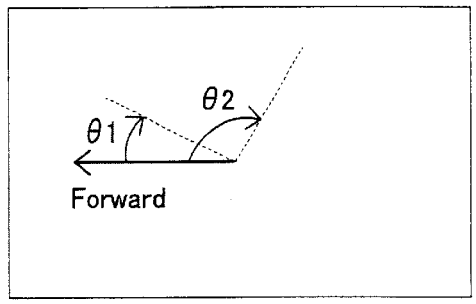

The radius of the hit area, the prescribed stay time Ts, and the prescribed passage time Tp may be changeable according to the kinds of the virtual clubs used in order to give the player a feeling of a natural shot. FIG. 24B shows an example of hit determination when the virtual club is an iron. The hit area is a circle with a radius r2 (r2<r1) within the game space G. Preferably, the prescribed passage time Tp2 for an iron is longer that that for a wood (Tp2>Tp1) and the prescribed distance for an iron d2 is shorter than that for a wood (d2<d1). It is because that the swing speed of an iron is much lower than that of a wood, and the player will not miss the ball. The relationship between the prescribed stay time Ts2 for an iron and that for a wood (Ts1) is not particularly limited. The hit determination for an iron is carried out the same as with a wood. FIG. 24C shows the concept of hit determination for a putter. The hit area is a circle with a radius r3 within the game space G (r3<r2<r1). The relationship between Tp1 and Tp2 and the prescribed passage time Tp3 for a putter is preferably Tp3>Tp2>Tp1. This is because the swing speed of a putter is slower than that of a wood and an iron. The prescribed distance d3 for a putter which corrects the swing gap may be zero because the player will not miss with a putter. The relationship between Ts1, Ts2, and the prescribed stay time Ts3 for a putter is not particularly limited. The hit determination for a putter is carried out the same as for a wood, and a correction for a missed swing is not necessary. Hereinafter, Ts1, Ts2, and Ts3 are expressed as the prescribed stay time Ts. Tp1, Tp2, and Tp3 are expressed as prescribed passage time Tp. d1,d2 and d3 are expressed as prescribed distance d.

The sound control means 17 will output sound effect data to the speaker 32 that was read out from the semiconductor memory 4 for RAM 4. The sound effects can include, but are not limited to, the sound of a ball flying through the air, the sound of applause or cheers, etc. Because the sound effects vary with the result of the hit determination, the realism of the golf game is improved.

The status determination means 18 specifies the trajectory of the golf ball according to the hit determination. The ball trajectory is specified based on the direction of the trajectory of the swing and the twist angle θa at address. The status determination means 18 determines whether a player hits the golf ball within the time limit, and updates the life of each player at each hole. Moreover, the status determination means 18 determines whether the golf ball goes into a cup based on the calculation of the ball trajectory, and calculates the score of each player at each hole. In addition, the status determination means 18 converts a player's score at each hole into his life. Then, the status determination means 18 determines the order of the players based on the total score, that is, the sum of lives at all holes.

In addition to foregoing process, the status determination means 18 moves the virtual player within the game space G according to the course being played and the position of the golf ball. The status determination means 18 can change the direction of the virtual player's view in response to a push of the buttons 106, and can change the direction in which the golf ball should be hit. For example, the status determination means 18 shifts the virtual player's view to the right side or shifts the ball direction to the right when the right button of the buttons 106 is pushed.

3-3. Process Flow

Figure 25:
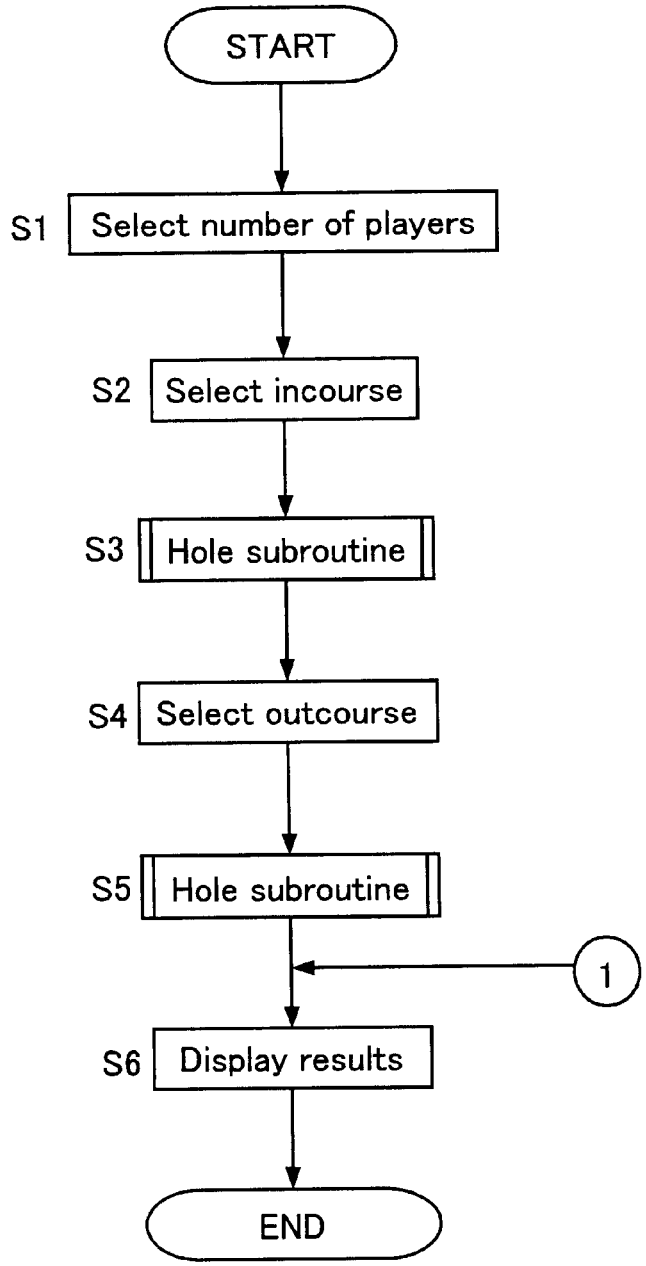
FIG. 25 shows a flowchart that illustrates the main process in the golf game system illustrated in FIG. 2.
Figure 26:
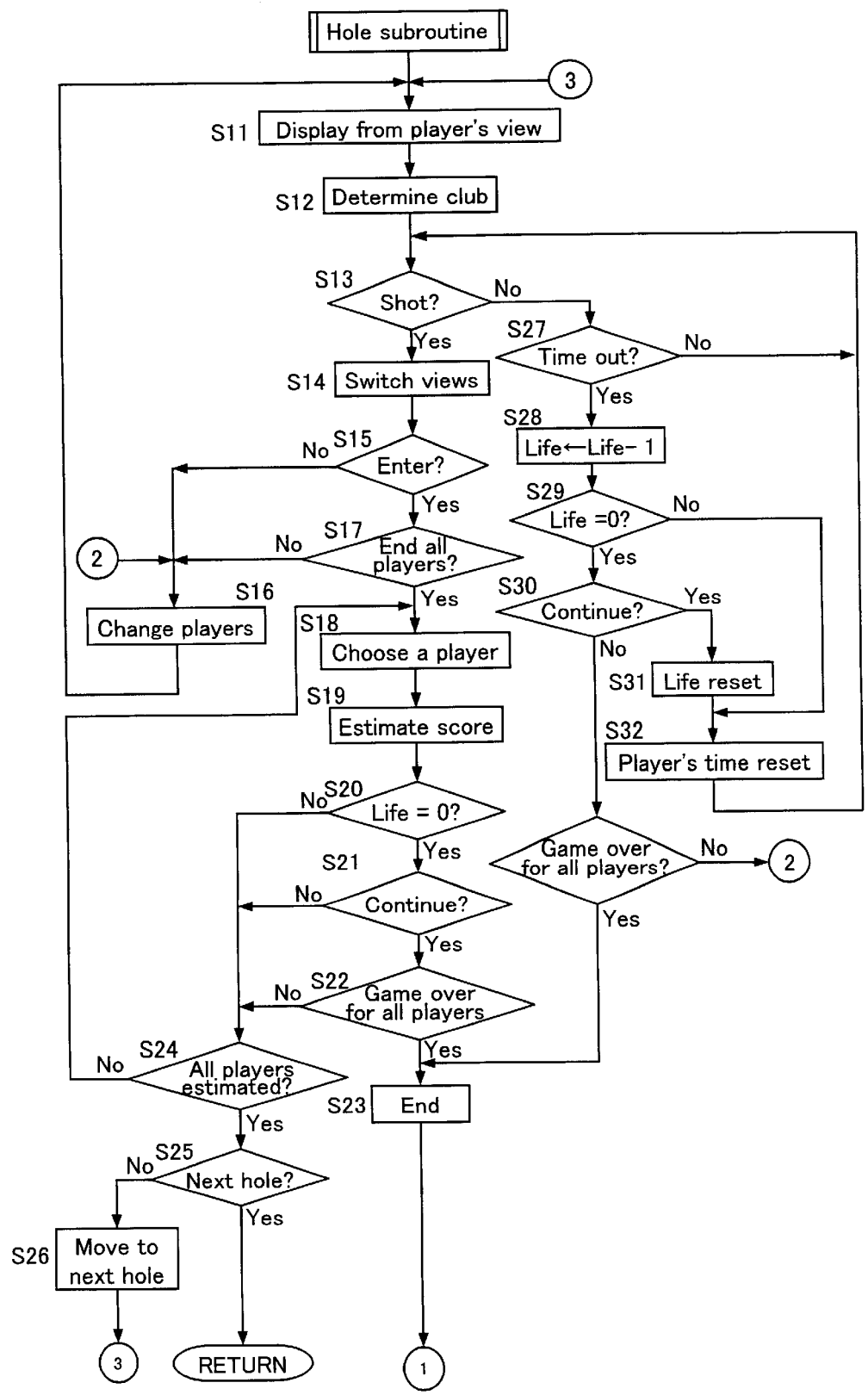
FIG. 26 shows a flowchart that illustrates a hole subroutine process in the golf game system illustrated in FIG. 2.
Figure 27:
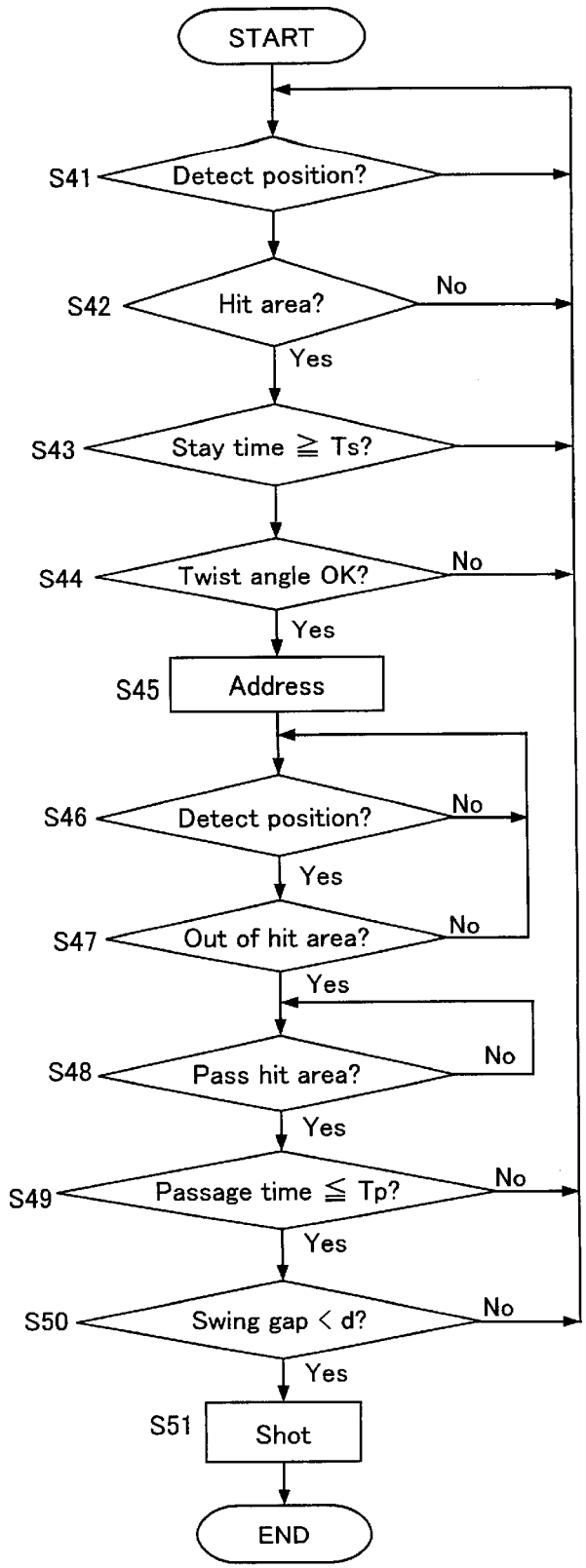
FIG. 27 shows a flowchart that illustrates a hit determining process in the golf game system illustrated in FIG. 2.

FIGS. 25 through 27 are flowcharts illustrating the flow of the overall processes in the present golf game system 2000. Below, details on the flow of the processes in the present golf game system 2000 will be explained with reference to these figures.

3-3-1. Main Routines

FIG. 25 is a flowchart illustrating the flow of the main routine of the present golf game system 2000. This routine is begun by a player inserting a coin into the coin deposit slot 108 in the game device 100.

Step S1: The player number selection means 11 accepts the selection of the number of players.

Step S2: The course selection means 12 accepts the selection of a course which corresponds to each difficulty level. At this step, the "front nine" is determined according to the course selected.

Step S3: The process at each hole of the 1–9 holes of the "front nine" are carried out by a hole subroutine. This process will be described in greater detail below.

Step S4: The course selection means 12 accepts the selection of a course that corresponds to each difficulty level. At this step, the "back nine" is determined according to the course selected.

Step S5: Processes at each hole for 10 to 18 holes of the "back nine" are carried out by the hole subroutine.

Step S6: The status determination means 18 determines the player's order based on the lifes of each hole, and displays the total score of each player and ends the game.

3-3-2 Hole Subroutine

FIG. 26 is a flowchart illustrating the flow of the processes carried out in the hole subroutine. This routine is begun by step S3 or step S5 in the main routine.

Step S11: The display control means 13 displays, on the monitors 101a and 101b, an under foot view and a front view. The front view is corrected as explained above.

Step S12: The club selection means 14 accepts the selection of the virtual club with the buttons 106.

Step S13: The status determination means 18 determines whether a player has hit the golf ball. This determination is carried out by a hit determination process that will be explained greater detail below. The status determination means 18 specifies the trajectory of the golf ball based on the trajectory of the virtual head and the twist angle θa at address. Then the process moves to step S14. If the player has not hit the golf ball, the process moves to step S27.

Step S14: The display controlling means 13 switches the views according to a player's shot result. Take, for an example, a situation in which a virtual player standing on the tee and hits a golf ball with a driver. The display control means 13 switches the front view on the monitor 101b to a view from a position in the middle of the course where the golf ball lands. The display control means 13 also switches the underfoot views on the monitor 101a according to the terrain where the golf ball lands. The display control means 13 can switch the front view on the monitor 101b to a view of a green when the golf ball gets onto a green. At the same time, the display control means 13 switches the underfoot view on the monitor 101a to a view of green-type grass.

Steps S15, 16, 17: The status determination means 18 determines whether the golf ball has entered a cup (S15). If it has not, the status determination means 18 displays an instruction for the player to change (S16). If it has, the status determination means 18 determines whether all players have ended the hole (S17), and if not, it instructs the player to change (S16). If all players end the hole, the process moves to step S18. In order to process the golf game smoothly, the instruction to change the player can be issued after any one of players ends the hole, although this is different from the real rules of golf.

Steps S18 to S24: The status determination means 18 calculates the players lives after the hole has ended. Suppose that each player's initial life is, for example, 3, when a hole starts. Any one of the players whose life has not been calculated yet is determined to be a process object (S18), and his life is updated based on his score at the hole (S19). If the score is a birdie and the life has decreased to one point, the life is updated to two. When the life becomes zero (S20), the status determination means 18 confirms whether the player will continue the game (S21). If the player will not continue the game, in other words, the player selects "game over", the status determination means 18 determines whether all players are "game over" (S22). If all players are "game over", the status determination means 18 ends the game (S23), and displays the game result (S6). If the player's life is not zero, the player's life is zero but the player has selected "game continue", or all of the players are not "game over", the status determination means 18 determines whether all of the players' lives has been calculated (S24). If not, the process moves to step S18 and the foregoing process is repeated. If all players' lives has been calculated, the process moves to step S25.

Steps S25, S26: The status determination means 18 determines whether there is another hole. If the current hole is the last hole, i.e., the 18th hole, then the status determination means 18 determines "No", and moves to step S6. If the current hole is not the last hole, the status determination means 18 moves the game space coordinates of all the virtual players to the next hole (S26).

Step S27 to S33: The status determination means 18 updates a player's life based on whether the golf ball is hit within the time limit for one shot. First, the status determination means 18 watches whether the golf ball was hit within the time limit (S27), then deducts one point from his life if it takes longer than the time limit (S28). Then, the status determination means S18 determines whether the player's life equals zero (S29). If the life is equal to zero, the status determination means 18 confirms whether the player will continue the game (S30). If the player selects "game continue" (S30), the status determination means 18 resets the player's life and his time for the shot, and allows the player to try the same shot again (S31, S32). If the life is not equal to zero, the status determination means 18 resets the player's time and allows him to try the same shot again (S32). If a player's life equals zero and the player selects "game over", the status determination means 18 determines whether all players are "game over" (S33). If "Yes", the status determination means 18 ends the game and displays the game results (S23, S6). If "No", the status determination means 18 instructs the player to change (S16). In this way, the players who did not select "game over" can continue the game.

3-3-3 Hit Determination Process

FIG. 27 is a flowchart illustrating the flow of the hit determination process. This routine is begun at step S13 in the hole subroutine.

Step S41, S42: The hit determination means 16 detects the newest game space coordinate Q" of the grip 200 (S41), and determines whether the virtual head is in the hit area (S42). If it is in the hit area, the process moves to step S43. If it is out of the hit area, the process moves to step S41.

Step S43: The hit determination means 16 determines whether the time that the virtual head has been in the hit area is or over the prescribed stay time Ts. This determination is carried out based on the head position table shown in FIG. 19. If "Yes", the process moves to step S44. If "No", the process moves to step S41.

Step S44: The hit determination 16 determines whether the twist angle θa at address is in the prescribed range (θ1≦θa≦θ2). The value of θa is the average value of the twist angle which changes while the virtual head is in the hit area. If "Yes", the process moves to step S45. If "No", the process returns to step S41.

Step S45: The hit determination means 16 determines that the player has addressed the ball.

Step S46, S47: The hit determination means 16 waits for the virtual head to go out of the hit area.

Step S48: The hit determination means 16 waits for the virtual head to pass through the hit area.

Step S49: The hit determination means 16 determines whether the time the virtual head takes to pass through the hit area less than or equal to the prescribed passage time Tp. If "Yes", the process moves to step S50. If "No", the process returns to step S41.

Step S50: The hit determination means 16 determines whether the swing gap is less than the prescribed distance d. If "Yes", the process moves to step S51. If "No", the process returns to step S41.

Step 51: The hit determination means 16 determines that the player hit the golf ball.

In this way, the present golf game system 2000 allows a player to swing the grip 200 with the feeling that the virtual head on the monitor 101a is connected with an invisible shaft extending from the grip 200. This system 2000 also allows a player to enjoy the true charms of golf, in that he sees the view displayed on the two monitors, aims at the direction in which a golf ball should travel, and hits the ball.

Other Embodiments

A. A Tennis Game

This invention can be applied to, for example, a tennis game system. The real interface device manipulated by a player is represented by a virtual tennis racket (hereinafter, referred to as a virtual racket) in the game space G. The virtual racket includes a virtual grip (a virtual contact unit) and a virtual racket face (virtual operation unit). A tennis game system may employ the configuration of the golf game system shown in FIG. 2. One monitor 23 is utilized instead of the two monitors 23a and 23b.

A-1. An Example of the Tennis Game System

Figure 28:
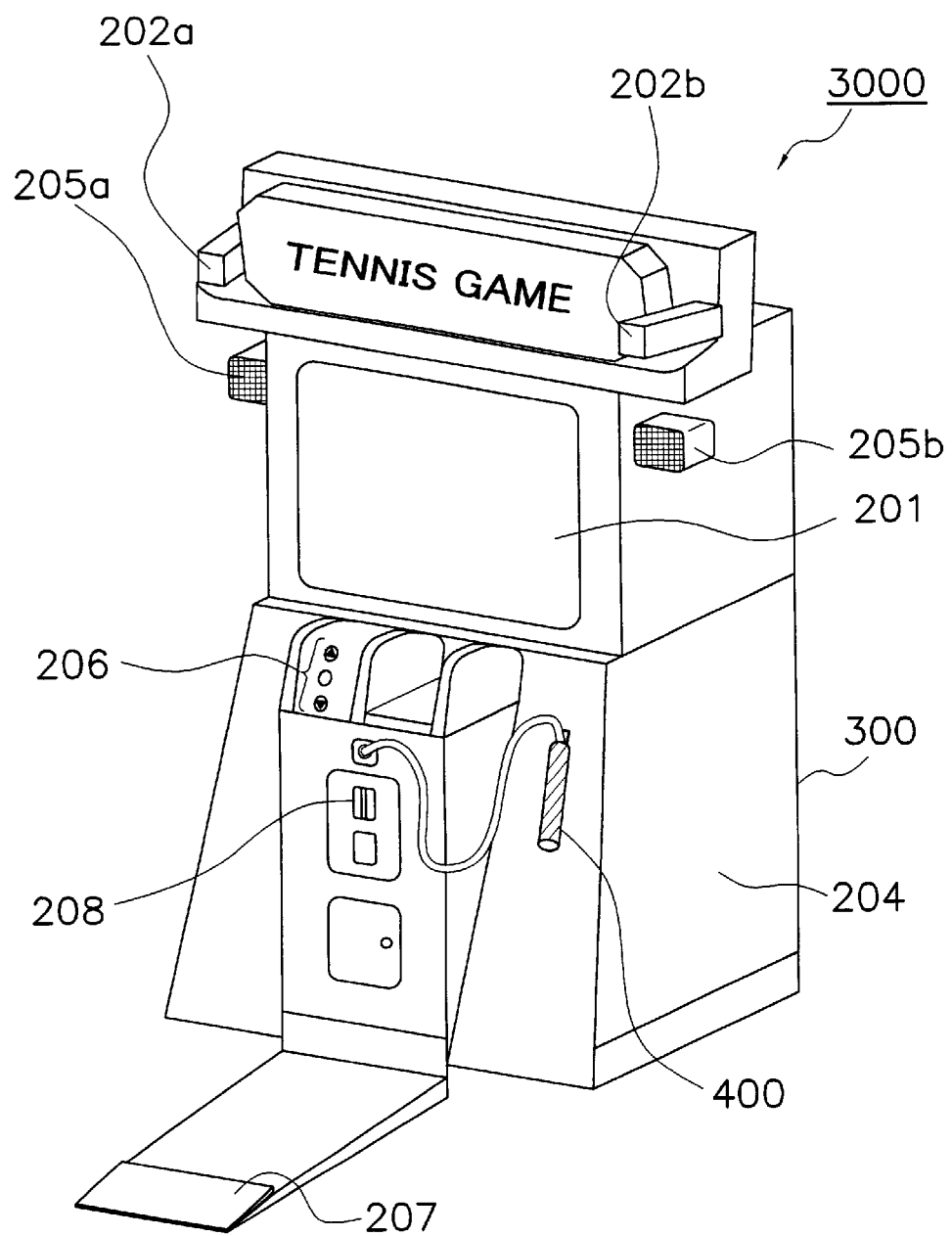
FIG. 28 is an oblique view of the outward appearance of a tennis game system which employs the game system illustrated in FIG. 1.

FIG. 28 is an oblique view of the outward appearance of the tennis game system 3000 in which foregoing game system 1000 is employed. The tennis game system 3000 includes a game device 300, and a grip 400 that serves as one example of a real interface device 51. The grip 400 may employ a configuration similar to that shown in FIG. 3.

A monitor 201 for image output is provided on the front portion of the game device 300 console. Light sensors 202a and 202b, which are only one example of light sensors included in the position detector 6, are installed on the left and right upper portions of the console. The light sensors 202a and 202b detect light from the light-emitting unit installed in a predetermined position on the grip 400. Speakers 205a and 205b are installed on the left and right sides of the upper portion of the monitor 201, and serve to output game background music and sound effect to the player. Buttons 206 are provided on the front of the console, and allow the player to select menus that are displayed on the monitor 201. A foot pedal 207 is provided at floor level at the front of the console. This foot pedal 207 is not essential to the invention. The buttons 206 are one specific example of the controllers 52 described above. A coin deposit slot 208 is provided in the middle of the lower portion of the console.

This tennis game system 3000 allows a player to swing the grip 400 and to play a tennis game with a competitor displayed on the monitor 201. The conversion method used to convert the real space coordinates of the grip 400 into the game space coordinates is the same as that used in the first embodiment. In this tennis game system 3000, displaying a tennis ball is necessary but displaying the virtual racket that a virtual player manipulates is not necessary. Hereinafter, the tennis game system 3000 in which a virtual racket is not displayed will be described.

A-2. Process

The process that the CPU 10 performs will now be described. The CPU 10 includes player number selecting means 11, course selection means 12, racket calculation means instead of the head displaying means 15, hit determination means 16, sound controlling means 17, and status determination means 18. The player number selection means 11 accepts the selection of singles or doubles from a player who manipulates the buttons 206. The course selection means 16 accepts the selection of difficulty level by pushing the buttons 206.

The racket calculation means determines the game space coordinates of the virtual racket face based on the real space coordinates of the grip 400. The game space coordinates of the virtual racket face can be coordinates of a position at which a straight line having an inclination angle φ intersects with the tennis court within the game space G. The straight line goes through the game space coordinates of the virtual grip. The inclination angle φ can be calculated in the same manner as in the first embodiment. The racket calculation means stores the game space coordinates in the RAM 19 over a predetermined time period Δt. In other word, the racket calculation means stores the swing trajectory of the virtual racket face over the period Δt. The swing trajectory is stored in a time series as game space coordinates that are taken every ¹⁄₁₆ sec, for example.

The hit determination means 16 determines whether the player has intentionally swung the grip 400. This determination can depend on whether the swing speed of the virtual racket face is greater than a certain level. The hit determination means 16 may determine that the player has stroked or has volleyed in accordance with the swing trajectory.

Moreover, the hit determination means 16 determines whether the virtual racket a player has intentionally swung has hit a tennis ball. This determination is carried out based on the trajectory of the tennis ball and the trajectory of the swing stored in the racket calculation means.

The hit determination means 16 preferably considers the size of the virtual racket face in order to carry out the above-mentioned determination. The size of the virtual racket face is not necessarily the size of the actual racket face, and is set so as not to decrease the enjoyment of the game. The hit determination means 16 may also determine the position on the virtual racket face at which the tennis ball hits.

In addition, the hit determination means 16 specifies a twist angle θ of the virtual racket face. The twist angle θ of the virtual racket face is an angle at which the virtual grip rotates from standard position around the longitudinal axis of it. The twist angle θ can be specified the same as the first embodiment. If the twist angle θ is out of the prescribed range, the hit determination means 16 determines that a player has swung and missed even though the trajectory of the virtual racket face hits the tennis ball. If the twist angle θ is in the prescribed range, the hit determination means 16 determines that the player has hit a drive or slice at the twist angle θ.

The sound control means 17 outputs sound effect data to the speakers 105a and 105b in accordance with the hit determination result.

The status determination means 18 calculates a trajectory of the tennis ball in accordance with the hit determination result. This calculation is carried out based on the swing direction and the twist angle θ. Accordingly, if the player has hit a drive or slice, the trajectory of the tennis ball is effected by the player's manipulation. Moreover, the status determination means 18 specifies the ball speed or the ball power in accordance with the swing speed. The ball speed or the power may be changeable in accordance with the position of the virtual racket face at which the tennis ball has hit.

Figure 29:
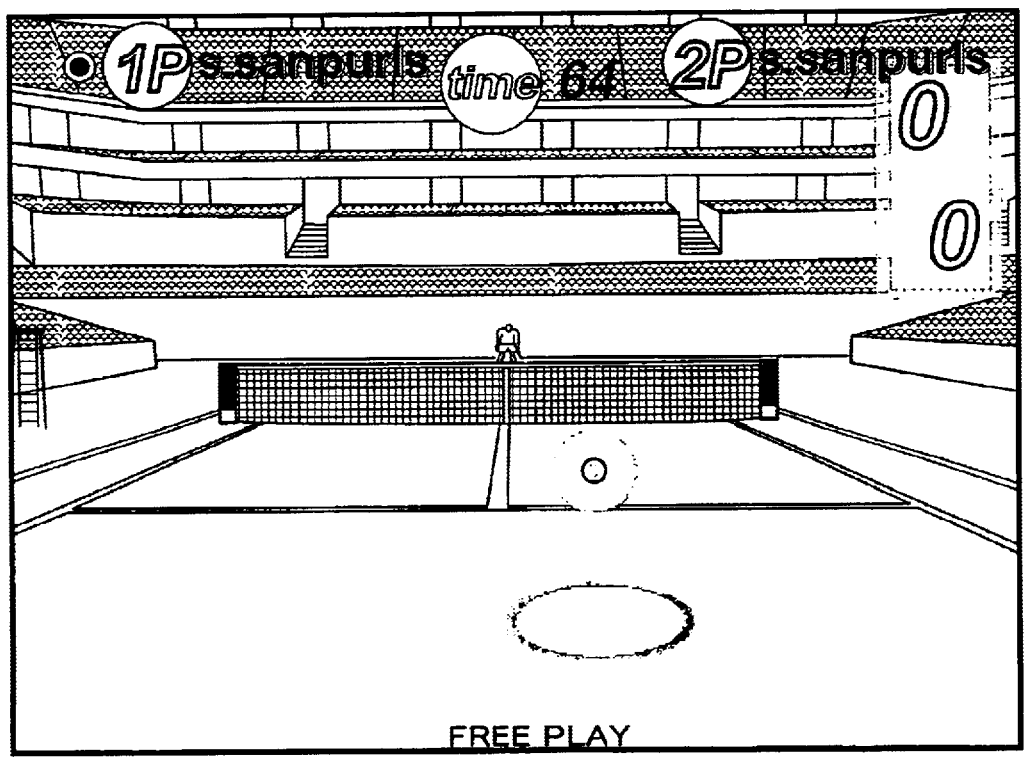
FIG. 29 is an example of a screen displayed in the tennis game system illustrated in FIG. 28, in which the view from the viewpoint of the virtual player who stands near the base line is displayed.
Figure 30:
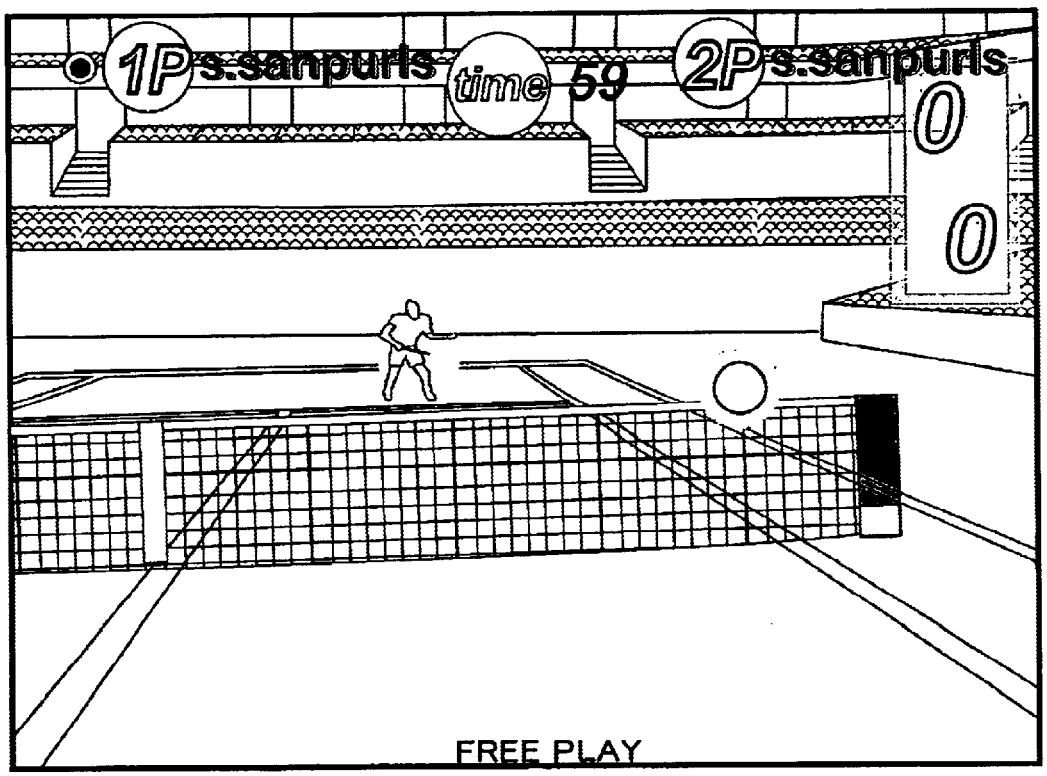
FIG. 30 is an example of a screen displayed in the tennis game system illustrated in FIG. 28, in which the view from the viewpoint of the virtual player who stands near the net is displayed.

In addition to these processes, the status determination means 18 allows the virtual player to move close to the net when the foot pedal 207 is stepped on. Accordingly, the game system 3000 allows the virtual player to attack by serve and volley or to volley by moving from the base line to the net. FIG. 29 shows an example of a screen in which the virtual player plays on the base line. FIG. 30 shows an example of a screen in which the virtual player moves forward by stepping on the foot pedal 207. Both screens display the view from the viewpoint of the virtual player within the game space G.

B. Other Games

Above-mentioned embodiments describe the present invention with respect to a golf game and a tennis game. However, the present invention is not limited to golf games and tennis games. Examples of the games to which the present invention maybe applied are cricket, gate ball, polo, baseball, ping-pong, badminton, fishing, and other games similar thereto.

C. Programs and Recording Media

Software programs that execute the aforementioned game method on a computer are included in the scope of the present invention, as too are computer-readable recording media on which the programs are recorded. Computer-readable recording media include, but are not limited to, floppy disks, hard disks, semiconductor memory, CD-ROMs, DVDs, magneto-optical disks (MOs) and other computer-read/writeable recording media that would allow the aforementioned software programs to be stored thereon.

This application claims priority to Japanese Patent Application No. 2001-322621. The entire disclosure of Japanese Patent Application No. 2001-322621 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A game device, comprising:
   a real interface device that resembles a contact unit of a sporting device having a contact unit that an athlete contacts and an operation unit that the athlete uses to act upon an object, the real interface device operated by a player in a real space in order to manipulate a virtual interface device having a virtual contact unit in contact with a virtual player and a virtual operation unit that acts upon a virtual object in a virtual space;
   real position detection means that detects real positions of the real interface device in the real space;
   position conversion means that converts real positions of the real interface device into virtual positions of the virtual contact unit in the virtual space such that the real positions of the real interface device with respect to the player in the real space match virtual positions of the virtual contact unit with respect to the virtual player;
   operation position calculation means that employs the virtual positions of the virtual contact unit in order to calculate virtual positions of the virtual operation unit; and
   control means that controls the position detection means so as to repeatedly detect the real positions of the real interface device, controls the conversion means so as to repeatedly convert the real positions of the real interface device to the virtual positions of the virtual contact unit, and changes the virtual positions of the virtual operation unit in accordance with changes in the real positions of the real interface device;
   wherein the virtual contact unit and the virtual operation unit respectively resemble the contact unit and the operation unit of the sporting device, and impart a feeling to the player that the real interface device is the sporting device when the player operates the real interface device.

2. The game device set forth in claim 1, further comprising:
   display means for displaying the virtual operation unit; and
   position determining means that determines a display position at which the virtual operation unit is displayed by utilizing the display means, based on the virtual position of the virtual operation unit.

3. The game device set forth in claim 2, wherein the real interface device and the virtual interface device are configured to be somewhat long;
   the game device further includes twist detecting means that detects a twist angle at which the real interface device rotates from a standard position around a longitudinal axis of the real interface device; and
   the control means controls the display means to display the virtual operation unit of the virtual interface device that rotates at the twist angle around the longitudinal axis of the virtual interface device.

4. The game device set forth in claim 3, wherein the twist detecting means calculates the twist angle of the real interface device based on signals outputted from an acceleration sensor installed on the real interface device.

5. The game device set forth in claim 2, wherein the game device is a golf game device, and further comprises:

front displaying means that displays front views in front of the player toward which the virtual object-is to travel after being acted upon by the virtual operation unit; and wherein the displaying means displays underfoot views at the virtual player's feet.

6. The game device set forth in claim 5, further comprising:

display controlling means that generates the underfoot views and the front views and displays the underfoot and front views by utilizing the displaying means and the front displaying means, wherein the underfoot and front views are from a viewpoint of the virtual player that is calculated from the virtual position of the virtual contact unit; and underfoot view storing means that stores high resolution underfoot views having a higher resolution than that of the underfoot views generated by the display controlling means; and wherein the display controlling means controls the underfoot views so that the high resolution underfoot views stored in the underfoot view storing means are displayed on behalf of the underfoot views generated byte display controlling means.

7. The game device set forth in claim 5, further comprising:

display controlling means that displays the underfoot views and the front views by utilizing the displaying means and the front displaying means, wherein the underfoot and front views are from a viewpoint of the virtual player that is calculated based on the virtual position of the virtual contact unit; and view controlling means that changes the front views based upon whether a target toward which the virtual object is to travel is close to or far from the virtual player.

8. The game device set forth in claim 1, wherein the position detection means further comprises:

light emitting means or light reflecting means installed on the real interface device;

at least a pair of light-detecting means that detects light from the light emitting means or light reflecting means; and measuring means for measuring a position of the light emitting means or the light reflecting means and outputting the measurement result to the position conversion means.

9. The game device set forth in claim 1, wherein the operation position calculation means determines the virtual position of the virtual operation unit by regarding it as a position at which a straight line intersects with the ground of the virtual space;

wherein the line goes through the virtual position of the virtual contact unit, and is at a virtual inclination angle $\phi$ with a standard plane in the virtual space.

10. The game device set forth in claim 9, further comprising:

inclination detecting means for detecting a real inclination angle between the real interface device and the standard plane in the real space; and wherein the operation position calculation means calculates the virtual position of the virtual operation unit by regarding the real inclination angle detected as the virtual inclination angle $\phi$.

11. The game device set forth in claim 10, wherein the inclination detecting means calculates the real inclination angle of the real interface device based on signals outputted from an acceleration sensor installed in the real interface device.

12. The game device set forth in claim 1, further comprising:

trajectory storing means for storing the virtual positions of the virtual operation unit taken at predetermined time intervals $\Delta T1$;

area determining means for determining whether the newest virtual position of the virtual operation unit stored is in a hit area in which the virtual object exists;

stay determining means for determining whether the virtual operation unit has been consecutively existing for a predetermined stay time Ts or more, based on the virtual positions stored, when the newest virtual position of the virtual operation unit exists in the bit area; and addressing means for determining that the player is addressing the virtual object when the virtual operation unit has been in consecutive existence in the hit area for the predetermined stay time Ts or greater.

13. The game device set forth in claim 12, further comprising:

passage determining means far determining whether the virtual operation unit has passed through the hit area when the player has addressed the virtual object;

speed determining means for determining whether a passage time is less than or equal to a predetermined passage time Tp, when the virtual operation unit has passed through the hit area;

operation determining means for determining whether the player has manipulated the virtual object by the virtual interface device, when a passage time is equal to or less than the predetermined passage time Tp.

14. The game device set forth in claim 13, further comprising:

trajectory determining means for determining the trajectory of the virtual operation unit in the hit area based on the data stored in a trajectory storing means, when the operation determining means determines that the player has manipulated the virtual object; and trajectory calculating means for calculating the trajectory on which the virtual object has moved, based on the trajectory of the virtual operation unit.

15. The game device set forth in claim 13, wherein the real interface device and the virtual interface device are configured to be somewhat long, and the game device further comprises:

twist detecting means that detects a twist angle at which the real interface device rotates from a standard position around a longitudinal axis of the real interface device;

trajectory determining means that determines the trajectory of the virtual operation unit in the bit area based on the data stored in the trajectory storing means, when the operation determining means determines the player has manipulated the virtual object; and trajectory calculating means that calculates the trajectory on which the object has moved, based on the trajectory of the virtual operation unit and the twist angle detected.

16. The game device set forth in claim 13, wherein the operation determining means determines the player has manipulated the virtual object, when the distance between the trajectory of the virtual operation unit and the virtual object is within an allowable range and the passage time is equal to or less than the predetermined passage Tp.

17. A game method employed in a game device, the game device including a real interface device that resembles a contact unit of a sporting device having a contact unit that an athlete contacts and an operation unit that to athlete uses to act upon an object, the real interface device operated by a player in a real space in order to manipulate a virtual interface device having a virtual contact unit in contact with a virtual player and a virtual operation unit that acts upon a virtual object in a virtual space, and the game method comprising the steps of:

- detecting real positions of the real interface device in the real space;
- converting real positions of the real interface device into virtual positions of the virtual contact unit in the virtual space such that the real positions of the real interface device with respect to the player in the real space match virtual positions of the virtual contact unit with respect to the virtual player;
- calculating virtual positions of the virtual operation unit by employing the virtual positions of the virtual contact unit; and
- controlling the detecting step so as to repeatedly detect the real positions of the real interface device, controlling the converting step so as to repeatedly convert the real positions of the real interface device to the virtual positions of the virtual contact unit, and changing the virtual positions of the virtual operation unit in accordance with changes in the real positions of the real interface device;
- wherein the virtual contact unit and the virtual operation unit respectively resemble the contact unit and the operation unit of the sporting device, and impart a feeling to the player that the real interface device is the sporting device when the player operates the real interface device.

18. A game program employed in a game device, the game device including a real interface device that resembles a contact unit of a sporting device having a contact unit that an athlete contacts and an operation unit that the athlete uses to act upon an object, the real interface device operated by a player in a real space in order to manipulate a virtual interface device having a virtual contact unit in contact with a virtual player and a virtual operation unit that acts upon a virtual object in a virtual space, the game program causing a computer to execute the steps of:

- detecting real positions of the real interface device in the real space;
- converting real positions of the real interface device into virtual positions of the virtual contact unit in the virtual space such that the real positions of the real interface device with respect to the player in the real space match virtual positions of the virtual contact unit with respect to the virtual player;
- calculating virtual positions of the virtual operation unit by employing the virtual positions of the virtual contact unit; and
- controlling the detecting step so as to repeatedly detect the real positions of the real interface device, controlling the converting step so as to repeatedly convert the real positions of the real interface device to the virtual positions of the virtual contact unit, and changing the virtual positions of the virtual operation unit in accordance with changes in the real positions of the real interface device;
- wherein the virtual contact unit and the virtual operation unit respectively resemble the contact unit and the operation unit of the sporting device, and impart a feeling to the player that the real interface device is the sporting device when the player operates the real interface device.

19. A game system, comprising:

- a real interface device that resembles a contact unit of a sporting device having a contact unit that an athlete contacts and an operation unit that the athlete uses to act upon an object, the real interface device operated by a player in a real space in order to manipulate a virtual interface device having a virtual contact unit in contact with a virtual player and a virtual operation unit that acts upon a virtual object in a virtual space;
- real position detection means that detects real positions of to real interface device in the real space;
- position conversion means that converts real positions of the real interface device into virtual positions of the virtual contact unit in the virtual space such that the real positions of the real interface device with respect to the player in the real space match virtual positions of the virtual contact unit with respect to the virtual player;
- operation position calculation means that employs the virtual positions of the virtual contact unit in order to calculate virtual positions of the virtual operation unit; and
- control means that controls the position detection means so as to repeatedly detect the real positions of the real interface device, controls the conversion means so as to repeatedly convert the real positions of the real interface device to the virtual positions of the virtual contact unit, and changes to virtual positions of to virtual operation unit in accordance with changes in the real positions of the real interface device;
- wherein the virtual contact unit and the virtual operation unit respectively resemble the contact unit and the operation unit of the sporting device, and impart a feeling to the player that the real interface device is the sporting device when the player operates the real interface device.

* * * * *